(12) United States Patent
Ohshima

(10) Patent No.: US 6,956,673 B2
(45) Date of Patent: Oct. 18, 2005

(54) IMAGE PROCESSING APPARATUS AND METHOD TO REDUCE GRAY LEVELS OF IMAGE

(75) Inventor: Seiji Ohshima, Itami (JP)

(73) Assignee: Minolta Co., Ltd., Osaka (JP)

( * ) Notice: Subject to any disclaimer, the term of this patent is extended or adjusted under 35 U.S.C. 154(b) by 922 days.

(21) Appl. No.: 09/795,974

(22) Filed: Mar. 1, 2001

(65) Prior Publication Data

US 2002/0051151 A1 May 2, 2002

(30) Foreign Application Priority Data

Mar. 2, 2000 (JP) .................................... P2000-057274
Mar. 29, 2000 (JP) .................................... P2000-091171

(51) Int. Cl.[7] ............................................. G06K 15/00
(52) U.S. Cl. .................. 358/3.01; 358/3.02; 358/3.03; 358/3.04; 358/3.19
(58) Field of Search ............................. 358/3.01, 3.02, 358/3.03, 3.04, 3.06, 3.1, 3.13, 3.19, 515, 530, 1.9, 2.1; 382/169, 237

(56) References Cited

U.S. PATENT DOCUMENTS

| | | | |
|---|---|---|---|
| 4,194,221 A | 3/1980 | Stoffel | 358/3.08 |
| 4,668,995 A | 5/1987 | Chen et al. | 382/272 |
| 4,955,065 A | 9/1990 | Ulichney | 382/270 |
| 5,014,333 A | 5/1991 | Miller et al. | 382/252 |
| 5,031,050 A | 7/1991 | Chan | 358/3.16 |
| 5,045,952 A | 9/1991 | Eschbach | 358/447 |
| 5,325,211 A | 6/1994 | Eschbach | 358/466 |
| 5,880,857 A * | 3/1999 | Shiau et al. | 358/3.03 |
| 5,953,498 A * | 9/1999 | Samworth | 358/1.9 |
| 2001/0015816 A1 * | 8/2001 | Metcalfe | 358/1.9 |

* cited by examiner

Primary Examiner—Jerome Grant, II
(74) Attorney, Agent, or Firm—McDermott Will & Emery LLP

(57) ABSTRACT

An image processing apparatus capable of providing an output image which is close to an actual image observed with human eyes is structured in the following way. An image data from an input unit is supplied from an output unit with a reduced number of gray levels. Based on an input value, an occurrence probability determining unit outputs dot occurrence probabilities d1–d3 for reproducing respective gray levels. Initial thresholds t1–t3 from an initial threshold generating unit are corrected based on a processed pixel in the vicinity of a pixel to be processed, and thus correction thresholds t'1–t'3 are derived. A selecting unit selects which dot is to be output based on the correction thresholds and occurrence probabilities.

21 Claims, 47 Drawing Sheets

F I G. 1 0

| | OUTPUT STATE | INITIAL THRESHOLD $t_i$ | CORRECTION THRESHOLD $t'_i$ | OCCURRENCE PROBABILITY $d_i$ | DETERMINATION VALUE $d_i - t'_i$ | OUTPUT $S_i$ | INVERTED OUTPUT | FB VALUE $fb_i$ | COEFFICIENT $\beta$ $\beta_i$ | $FB*\beta$ |
|---|---|---|---|---|---|---|---|---|---|---|
| (1) | 1 | 0.5 | 0.5 | 0.4 | -0.1 | 0 | 1 | 0.5 | 0.5 | 0.25 |
| | 2 | 0.5 | 0.5 | 0.5 | 0 | 1 | 0 | -0.5 | 0.5 | -0.25 |
| | 3 | 0.5 | 0.5 | 0.1 | -0.4 | 0 | 1 | 0.5 | 0.5 | 0.25 |
| (2) | 1 | 0.5 | 0.25 | 0.4 | 0.15 | 1 | 0 | -0.25 | 0.5 | -0.125 |
| | 2 | 0.5 | 0.75 | 0.5 | -0.25 | 0 | 1 | 0.25 | 0.5 | 0.125 |
| | 3 | 0.5 | 0.25 | 0.1 | -0.15 | 0 | 1 | 0.75 | 0.5 | 0.375 |
| (3) | 1 | 0.5 | 0.625 | 0.4 | -0.225 | 0 | 1 | 0.375 | 0.5 | 0.1875 |
| | 2 | 0.5 | 0.375 | 0.5 | 0.125 | 1 | 0 | -0.375 | 0.5 | -0.1875 |
| | 3 | 0.5 | 0.125 | 0.1 | -0.025 | 0 | 1 | 0.875 | 0.5 | 0.4375 |
| (4) | 1 | 0.5 | 0.3125 | 0.4 | 0.0875 | 1 | 0 | -0.3125 | 0.5 | -0.15625 |
| | 2 | 0.5 | 0.6875 | 0.5 | -0.1875 | 0 | 1 | 0.3125 | 0.5 | 0.15625 |
| | 3 | 0.5 | 0.0625 | 0.1 | 0.0375 | 1 | 0 | 0.9375 | 0.5 | 0.46875 |
| (5) | 1 | 0.5 | 0.65625 | 0.4 | -0.25625 | 0 | 1 | 0.34375 | 0.5 | 0.171875 |
| | 2 | 0.5 | 0.34375 | 0.5 | 0.15625 | 1 | 0 | -0.34375 | 0.5 | -0.17188 |
| | 3 | 0.5 | 0.03125 | 0.1 | 0.06875 | 1 | 0 | 0.96875 | 0.5 | 0.484375 |
| (6) | 1 | 0.5 | 0.328125 | 0.4 | 0.071875 | 1 | 0 | 0.671875 | 0.5 | 0.335938 |
| | 2 | 0.5 | 0.671875 | 0.5 | -0.17188 | 0 | 1 | 0.328125 | 0.5 | 0.164063 |
| | 3 | 0.5 | 0.015625 | 0.1 | 0.084375 | 1 | 0 | -0.01563 | 0.5 | -0.00781 |
| (7) | 1 | 0.5 | 0.164063 | 0.4 | 0.235938 | 1 | 0 | -0.16406 | 0.5 | -0.06203 |
| | 2 | 0.5 | 0.335938 | 0.5 | 0.164063 | 0 | 1 | 0.664063 | 0.5 | 0.332031 |
| | 3 | 0.5 | 0.507813 | 0.1 | -0.40781 | 0 | 1 | 0.492188 | 0.5 | 0.246094 |
| (8) | 1 | 0.5 | 0.582031 | 0.4 | -0.18203 | 0 | 1 | 0.417969 | 0.5 | 0.208984 |
| | 2 | 0.5 | 0.167969 | 0.5 | 0.332031 | 1 | 0 | -0.16797 | 0.5 | -0.08398 |
| | 3 | 0.5 | 0.253906 | 0.1 | -0.15391 | 0 | 1 | 0.746094 | 0.5 | 0.373047 |
| (9) | 1 | 0.5 | 0.291016 | 0.4 | 0.108984 | 1 | 0 | -0.29102 | 0.5 | -0.14551 |
| | 2 | 0.5 | 0.583984 | 0.5 | -0.08398 | 0 | 1 | 0.416016 | 0.5 | 0.208008 |
| | 3 | 0.5 | 0.126953 | 0.1 | -0.02695 | 0 | 1 | 0.873047 | 0.5 | 0.436523 |
| (10) | 1 | 0.5 | 0.645508 | 0.4 | -0.24551 | 0 | 1 | 0.354492 | 0.5 | 0.177246 |
| | 2 | 0.5 | 0.291992 | 0.5 | 0.208008 | 1 | 0 | -0.29199 | 0.5 | -0.146 |
| | 3 | 0.5 | 0.083477 | 0.1 | 0.036523 | 0 | 1 | 0.936523 | 0.5 | 0.468262 |
| (11) | 1 | 0.5 | 0.322754 | 0.4 | 0.077246 | 1 | 0 | -0.32275 | 0.5 | -0.16138 |
| | 2 | 0.5 | 0.645996 | 0.5 | -0.146 | 0 | 1 | 0.354004 | 0.5 | 0.177002 |
| | 3 | 0.5 | 0.031738 | 0.1 | 0.068262 | 0 | 1 | 0.968262 | 0.5 | 0.484131 |
| (12) | 1 | 0.5 | 0.661377 | 0.4 | -0.26138 | 0 | 1 | 0.338623 | 0.5 | 0.169312 |
| | 2 | 0.5 | 0.322998 | 0.5 | 0.177002 | 1 | 0 | -0.323 | 0.5 | -0.1615 |
| | 3 | 0.5 | 0.015869 | 0.1 | 0.084131 | 0 | 1 | 0.984131 | 0.5 | 0.492065 |

(LATERAL AXIS) INPUT           x x

F I G. 43
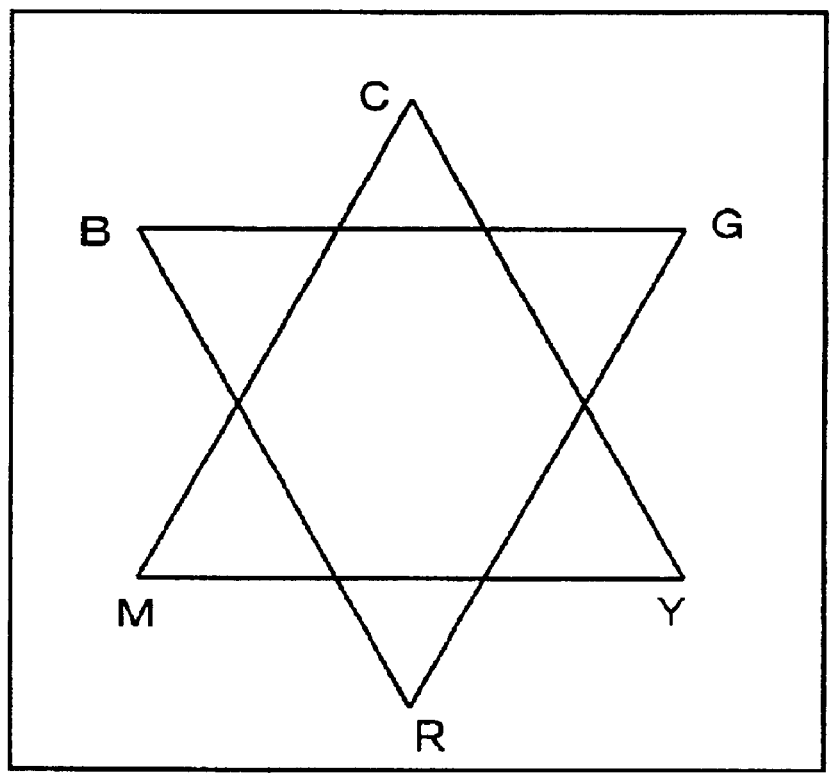

IMAGE PROCESSING APPARATUS AND METHOD TO REDUCE GRAY LEVELS OF IMAGE

This application is based on Application Nos. 2000-57274 and 2000-91171 filed in Japan, the contents of which are hereby incorporated by reference.

BACKGROUND OF THE INVENTION

1. Field of the Invention

The present invention relates to image processing apparatus and method. In particular, the invention relates to an apparatus and a method that can determine an output state of a pixel to be output, among a plurality of output states which the pixel can take, the determination being made in consideration of the probability of occurrence of each output state.

2. Description of the Related Art

An image processing apparatus has been known that reduces gray scale levels of a multi-gray-level image and then outputs a resultant image. One of known methods for reproducing the entire gradation of an input image is error diffusion.

FIG. 44 is a block diagram showing a structure of an image processing apparatus employing the error diffusion method.

Referring to FIG. 44, the image processing apparatus includes an input unit 801 supplying pixel values (input signals) one by one from a multi-gray-level image to be processed, a subtracter 803 subtracting an error from the input pixel value, a thresholding unit 807 thresholding the output of subtracter 803, an output unit 809 outputting the thresholded value, and a subtracter 811 subtracting the output of subtracter 803 from the thresholded value to calculate the error.

The applicant of the present application proposes in Japanese Patent Application No. 11-237492 threshold diffusion method according to which the difference between a threshold and an output value is used for processing neighboring pixels.

FIG. 45 is a block diagram showing an image processing apparatus employing the threshold diffusion method.

Referring to FIG. 45, the image processing apparatus includes an input unit 901 supplying a pixel value of image data to be processed, a thresholding unit 903 thresholding the pixel value, an output unit 905 outputting the thresholded value, an initial threshold generator 913 supplying initial threshold Th (x), a subtracter 915 subtracting an error of the threshold from the value from initial threshold generator 913, an inverting unit 907 inverting the thresholded value, a subtracter 909 subtracting the output of subtracter 915 from the output of the inverting unit 907 to output the error of the threshold, and a β multiplier 911 multiplying the output of subtracter 909 by coefficient β.

The image processing apparatus using the threshold diffusion method "diffuses" the error of the threshold to a threshold for processing neighboring pixels.

The error diffusion or threshold diffusion method discussed above can be used to binarize an image of multiple gray levels. Further, the error diffusion or threshold diffusion method can be applied to each of a plurality of regions created by dividing an input range to convert a multi-gray-level image into an image of an arbitrary number (at least three) of gray levels (see for example Japanese Patent Application No. 11-237492 referred to above). However, these methods cannot implement three or more gray levels mixed, with respect to an input value for a certain region.

According to a proposed method for implementing a mixture of three or more gray levels (or three or more output states), the error diffusion method can be applied to a vector space. This approach is not enough to uniformly distribute the mixed states.

In addition, when an image data is to be output, the gray levels of the image data should be reduced (halftoning) depending on the number of gray levels which a device can output. In other words, when one image is to be output from a plurality of different output devices, different halftoning processes are necessary for respective output devices. Then, the output devices require to have separate halftoning functions respectively.

FIG. 46 shows a system of outputting a specific image from a plurality of output devices. Referring to FIG. 46, the system includes a host 501, a network 503, and a plurality of terminals 505a–505d receiving image data. An image to be distributed (distribution image) A is supplied to host 501 and then transmitted to terminals 505a–505d via network 503.

Terminal 505a is coupled to output devices b and c, terminal 505b is coupled to an output device d, and terminal 505c is connected to an output device e.

Distribution image A undergoes an image conversion process in host 501 before being transmitted. In this conversion process, mainly compression is performed for the purpose of reducing image data volume. Image conversion, mainly decompression, is further performed in each of terminals 505a–505d for reconstituting the image.

In output devices b–e, the gray levels of the image data is reduced for output (e.g. the image data is converted to binary or multi-level image).

These processes thus provide output images B–E from output devices b–e respectively.

Even if output devices b–e have a relatively simple structure, halftoning is still necessary in respective output devices having different output levels. Consequently, each output device has its memory and resource under a heavy load or requires a calculation time.

FIGS. 47–50 are flowcharts showing four manners of distributing an image respectively.

Referring to FIG. 47, a distribution image A of n gray-scale levels (n levels) is compressed in step S601 without being halftoned and then transmitted in step S603. On the receiver side, the image data is decompressed in step S605. In step S607, the image data is halftoned for reducing the n gray levels of the image data into m levels. In this way, the receiver side obtains an output image B of m levels.

Referring to FIG. 48, a distribution image A of n levels is first halftoned on the transmitter side to reduce n levels to m levels (S611). The image data is compressed in step S613 and then transmitted in step S615. On the receiver side, the received image data is decompressed in step S617 to obtain an output image B of m levels.

Referring to FIG. 49, an n-level distribution image A is converted on the transmitter side into an nn-level image (S621). The converted image is compressed in step S623 to be transmitted in step S625.

On the receiver side, the image data is decompressed in step S627 and halftoning is performed to convert the nn-level into m-level in step S629. Accordingly, an output image B of m gray levels can be obtained.

Referring to FIG. 50, an n-level distribution image A is converted into an nn-level image (S631). Then, the image is compressed in step S633 to be transmitted in step S635.

On the receiver side, the image data is decompressed in step S637 and the gray scale is reconstituted from nn levels to n levels. In step S641, halftoning is applied for reducing gray levels from n to m levels, and then an output image B of m levels is achieved.

In terms of cost for transmitting an image, the volume of the image is desirably reduced as much as possible. If the image is finally provided from an output device, the image is halftoned which reduces the volume of the image. Accordingly, it would be efficient depending on purposes that an image is first halftoned on the transmitter side as shown in FIG. 48 and then transmitted.

In this case, however, output devices on the receiver side must have the same number of output gray levels. If not, as shown in FIG. 47, the receiver side requires individual halftoning.

The load of halftoning can be reduced even by a small degree by preliminarily decreasing the number of gray levels of an image to a certain extent on the transmitter side, and further decreasing the number of gray levels for each of the output devices. Additionally, the volume of data being transmitted can also be reduced to some extent (see FIG. 49).

The conventional halftoning method, however, has difficulty in directly converting an image with reduced gray levels to an image of further reduced gray levels. Then, as shown in FIG. 50, an image of multiple levels requires reconstruction (S639), which adds load to the receiver side. This process is also disadvantageous in terms of precision in tone reproduction.

SUMMARY OF THE INVENTION

The present invention has been made to solve the problems above. One object of the invention is to provide an image forming method enabling enhancement of precision in tone reproduction.

Another object of the invention is to provide an image processing apparatus that can provide an image exhibiting a mixture of a plurality of output states as a whole satisfying desired characteristics, the output states being uniformly distributed.

According to one aspect of the invention, for accomplishing the objects above, an image processing apparatus converting first image data having a predetermined number of gray levels into second image data having a smaller number of gray levels than the predetermined number includes: an input unit successively inputting a signal of each pixel in the first image data; an occurrence probability setting unit setting per pixel an occurrence probability of each gray level of the second image data according to the input signal; a threshold setting unit setting per pixel a threshold used for converting the input signal of each pixel of the first image data into a signal of each pixel of the second image data; a converting unit according to the set occurrence probability and the set threshold to convert the input signal of each pixel of the first image data into the signal of each pixel of the second image data; a calculating unit according to a gray level of the signal of each pixel of the second image data generated by the conversion and to the set occurrence probability or the set threshold to calculate a feedback value for an adjacent unprocessed pixel; and a correcting unit according to the calculated feedback value to correct the occurrence probability or threshold used for converting the unprocessed pixel.

According to another aspect of the invention, an image processing method for converting first image data having a predetermined number of gray levels into second image data having a smaller number of gray levels than the predetermined number includes the steps of: successively inputting a signal of each pixel in the first image data; setting per pixel an occurrence probability of each gray level of the second image data according to the input signal; setting per pixel a threshold used for converting the input signal of each pixel of the first image data into a signal of each pixel of the second image data; converting, according to the set occurrence probability and the set threshold, the input signal of each pixel of the first image data into the signal of each pixel of the second image data; calculating, according to a gray level of the signal of each pixel of the second image data generated by the conversion and to the set occurrence probability or the set threshold, a feedback value for an adjacent unprocessed pixel; and correcting, according to the calculated feedback value, the occurrence probability or threshold used for converting the unprocessed pixel.

According to still another aspect of the invention, an image processing method for processing a subject input image and thereafter outputting the processed image is characterized in that the output image exhibits a mixture of at least three levels with respect to a region of the same input state and each level is evenly distributed.

According to a further aspect of the invention, an image processing method for converting first image data having a predetermined number of gray levels into image data having a smaller number of gray levels than the predetermined number includes: a first step of converting the first image data into a first halftone image exhibiting a mixture of at least three levels with respect to a region of the same input state; and a second step of thresholding the first halftone image generated by the first step to generate a second halftone image having a smaller number of gray levels than the predetermined number.

According to a still further aspect of the invention, an image processing method for converting first image data having a predetermined number of gray levels into image data having a smaller number of gray levels than the predetermined number includes: a first step of converting the first image data into a first halftone image exhibiting a mixture of at least three levels with respect to a region of the same input state; and a second step of receiving and outputting by a plurality of terminals the first halftone image generated by the first step.

According to a still further aspect of the invention, a method of distributing first image data having a predetermined number of gray levels as image data having a smaller number of gray levels than the predetermined number includes: a first step of converting the first image data into a first halftone image exhibiting a mixture of at least three levels with respect to a region of the same input state; and a second step of holding the first halftone image generated by the first step on a network for distribution.

According to a still further aspect of the invention, an image processing method for converting first image data having a predetermined number of gray levels into image data having a smaller number of gray levels than the predetermined number includes the steps of: receiving the first image data converted into a first halftone image exhibiting a mixture of at least three levels with respect to a region of the same input state; and thresholding the first halftone image to output the first halftone image having a smaller number of gray levels than the original number of gray levels of the first halftone image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 10–13 show specific processes of first to fourth examples respectively of halftoning A.

FIG. 43 shows a relation between colors CMYRGB.

DESCRIPTION OF THE PREFERRED EMBODIMENTS

First Embodiment

A method of forming a halftone image is now described according to one embodiment of the present invention. In this embodiment, a multilevel halftone image of N levels is prepared, the image having a mixture of pixels of respective levels (halftoning A), and the multilevel halftone image of N levels is thresholded with an appropriate number of thresholds (halftoning B) to generate a halftone image of m levels (m is an arbitrary number, m<N).

An output image is first formed through halftoning A described above, and then the image is received via a network on the receiver side where the image is processed simply through halftoning B. Accordingly, images can be output from respective output devices with different number of gray levels.

Figure 1:
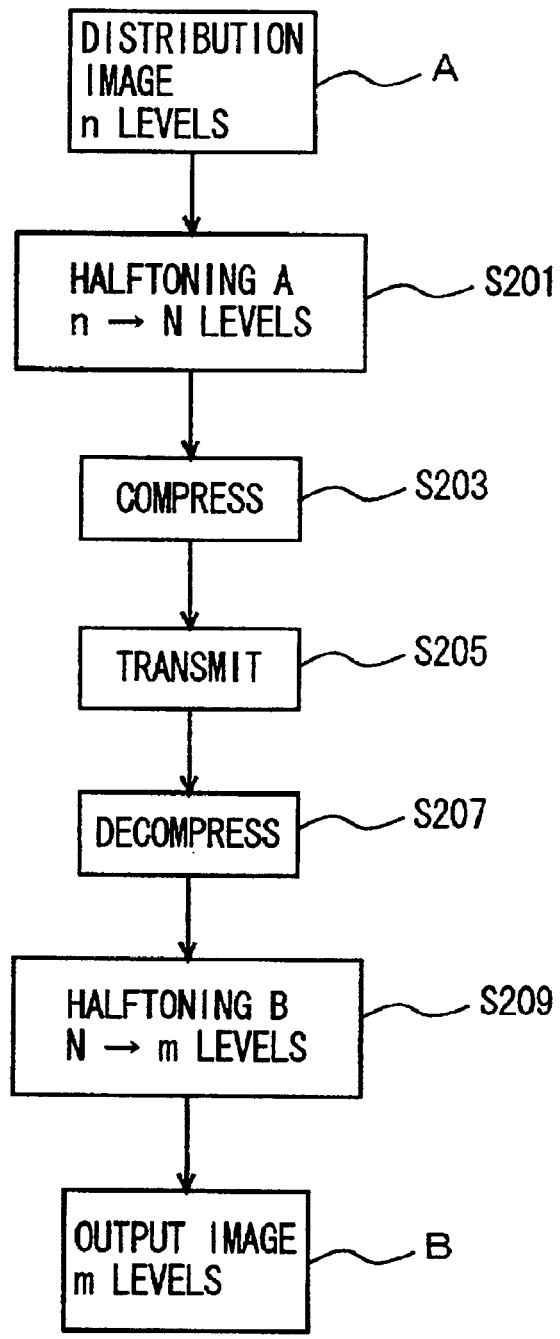
FIG. 1 is a flowchart showing a process of a method of forming a halftone image according to one embodiment of the present invention.

FIG. 1 is a flowchart illustrating a process flow of the halftone image forming method according to the first embodiment.

Referring to FIG. 1, according to the first embodiment, an image A to be distributed (image having n gray levels) undergoes the process of halftoning A in step S201. Through this process of halftoning A, n gray levels of distribution image A is reduced to N levels. Further, halftoning A generates from the multi-gray-level image (distribution image A) an image where pixels of respective N levels are mixed. By means of halftoning A, one gray level of the input image is output in at least three output states.

In step S203, the N-level image having undergone halftoning A is compressed. In step S205, the compressed image is distributed via the network. In step S207, the compressed image data is decompressed on the receiver side.

In step S209, the received N-gray-level image undergoes halftoning B. Then, the image having N gray levels is converted into an image of m levels (n>N>m). Halftoning B corresponds to conventional simple gray scale processing using threshold.

An output image B having m gray levels is thus generated.

Figure 2:
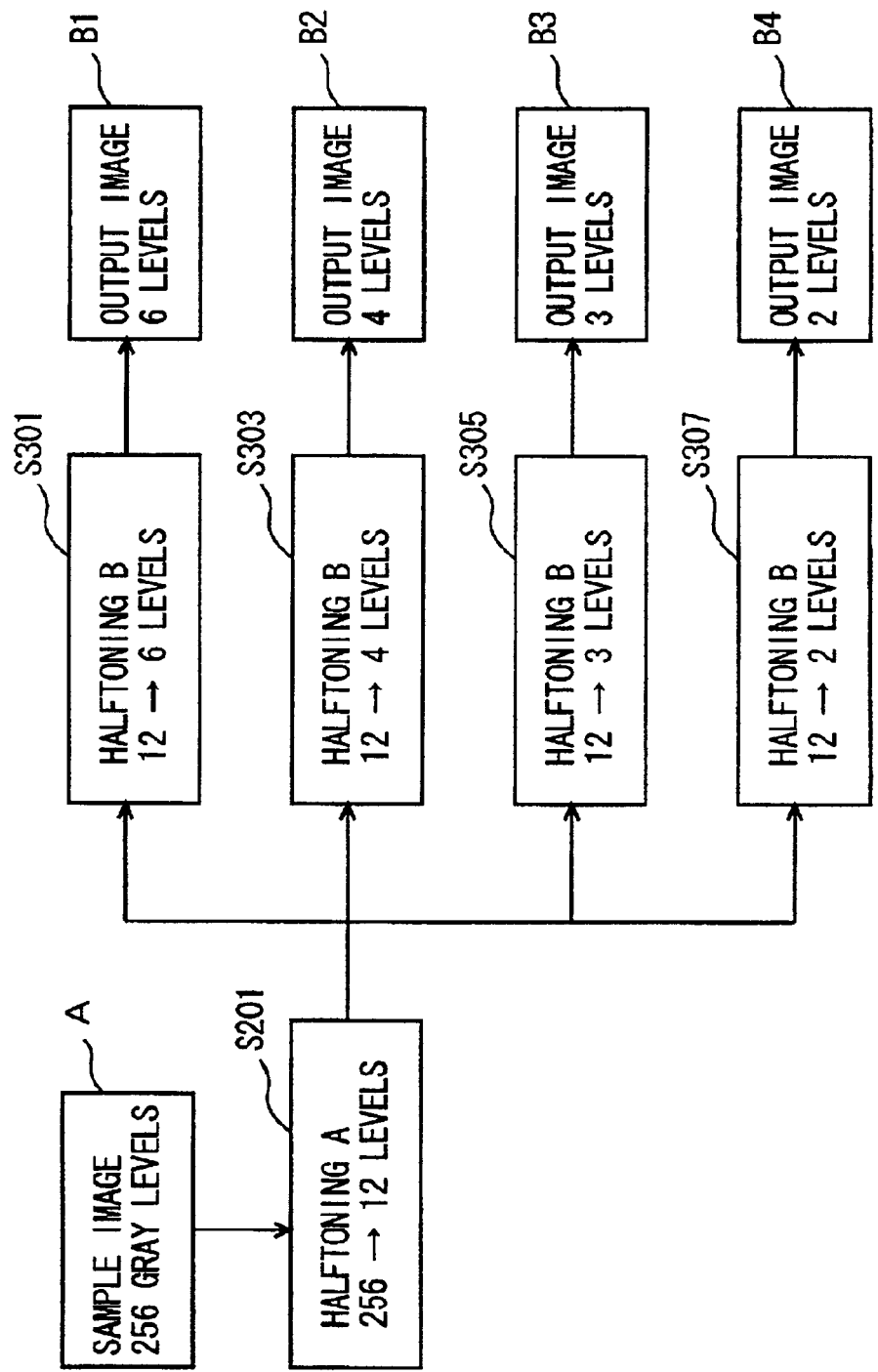
FIG. 2 illustrates a specific use of the halftone image forming method.

FIG. 2 specifically illustrates a method of distributing an image using the halftone image forming method according to this embodiment.

On the transmitter side of images, a sample image A with 256 gray levels is converted into an image of 12 gray levels through halftoning A (S201). The resultant image is received by a plurality of terminals via a network. These terminals employ halftoning B to generate respective images having gray levels adapted for characteristics of output devices.

Specifically, in step S301, halftoning for reducing levels from 12 to 6 is performed to produce an output image B1 of 6 levels. In step S303, halftoning for reducing levels from 12 to 4 is performed to generate an output image B2 of 4 levels. In step S305, halftoning for reducing levels from 12 to 3 is performed to produce an output image B3 of 3 levels. In step S307, halftoning for reducing levels from 12 to 2 is performed to produce an output image B4 of 2 levels.

Halftoning A and halftoning B are more specifically described below.

First Example of Halftoning A

Figure 3:
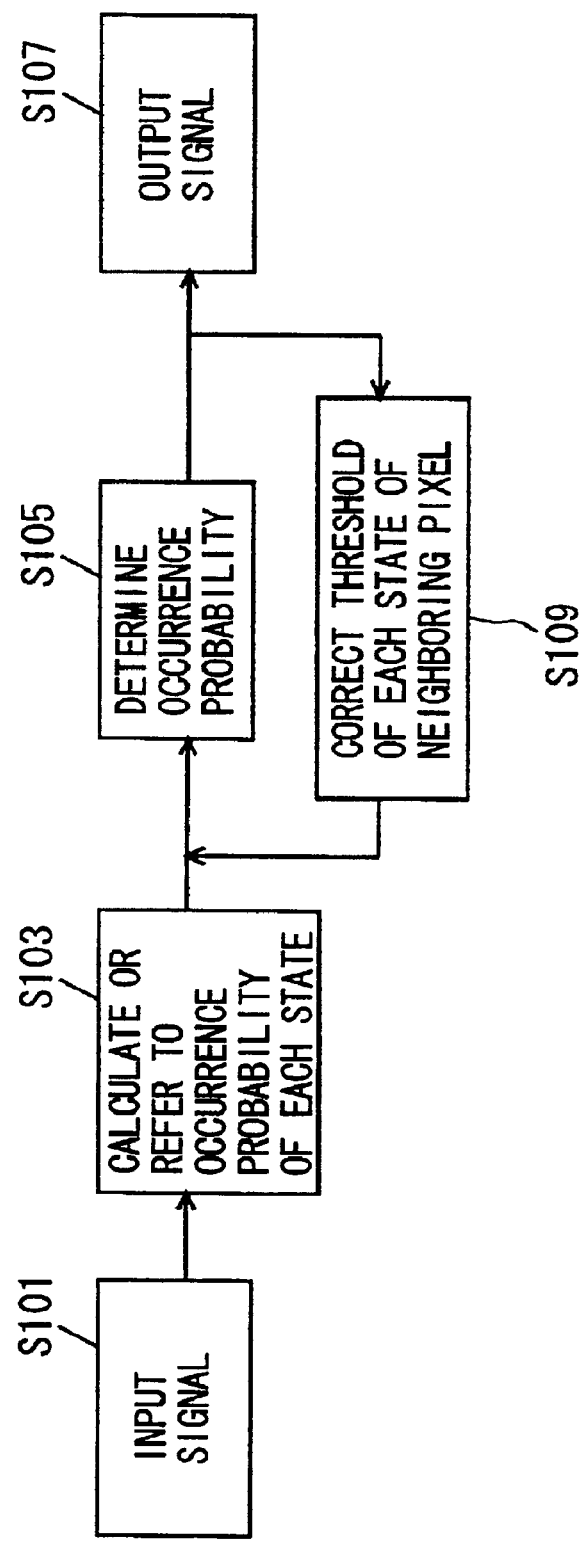
FIG. 3 shows an operation of an image processing apparatus implementing a first example of halftoning A.

FIG. 3 generally shows a process in an image processing apparatus carrying out halftoning A. The image processing apparatus converts an input signal of multiple gray levels into an output signal of a plurality of (at least three) gray levels (hereinafter called output states). Referring to FIG. 3, in step S101, a pixel value (input signal) of one pixel in image data to be processed is supplied.

In step S103, based on the input signal, the probability of occurrence is determined for each of output states which pixels to be output can take. The occurrence probability may be determined by calculation or by reference to a pre-stored table data. Alternatively, both of calculation and table data may be employed. Here, the occurrence probability must be set based on the input signal before an output state is determined regardless of the method employed. Determination of the occurrence probability is hereinafter described in detail.

It is supposed here that output states having respective occurrence probabilities of d1, d2 and d3 represent output values (densities) 0, 0.5 and 1.0 respectively. The average output value is represented as shown below by multiplying each output value by its occurrence probability.

$$z=0\times d1(x)+0.5\times d2(x)+1.0\times d3(x)$$

When the output value reflects an input value, "output value z=input value x" is applied to the equation above. Then, d1, d2 and d3 should be set to satisfy the following equation.

$$x=0\times d1(x)+0.5\times d2(x)+1.0\times d3(x)$$

On the other hand, the occurrence probabilities must satisfy the relation below as the sum of them should be equal to 1.

$$d1(x)+d2(x)+d3(x)=1$$

Any method can be selected for setting such d1, d2 and d3. For example, it is possible as shown in FIG. 4 to set a bell-shaped function having its peak at each representative output value (0, 0.5, 1.0).

Figure 4:
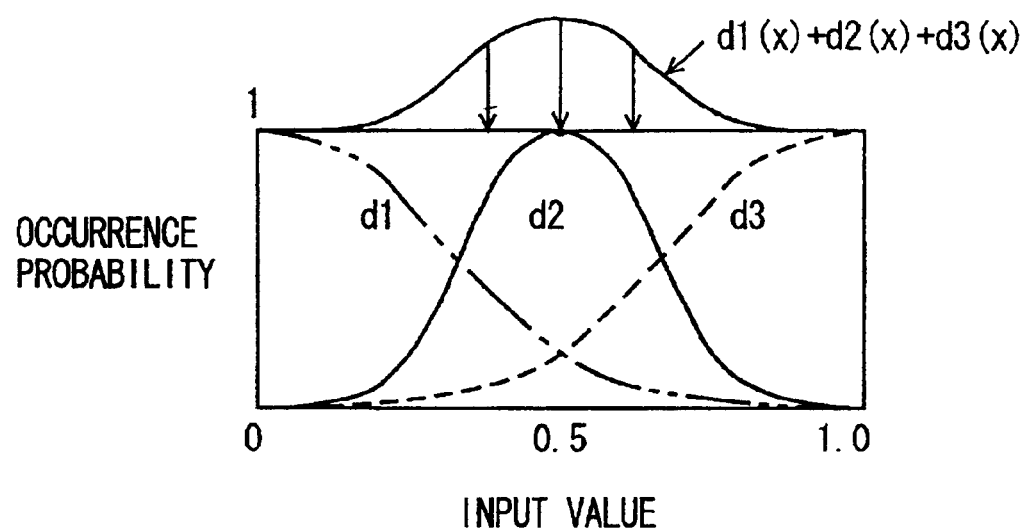
FIGS. 4 and 5 show distribution of occurrence probabilities with respect to an input value.

Specifically, referring to FIG. 4, when an input value ranges from 0 to 1.0 and d1, d2 and d3 are occurrence probabilities corresponding to respective outputs 0, 0.5 and 1.0, function d1(x) is a bell-shaped function having its peak at input value x=0, function d2(x) is a bell-shaped function having its peak at x=0.5 and function d3(x) is a bell-shaped function having its peak at x=1.0.

In the example of FIG. 4, the sum of occurrence probabilities (d1(x)+d2(x)+d3(x)) with respect to input value x is not necessarily equal to 1. Then, the value d1(x)+d2(x)+d3(x) is compressed as indicated by arrows in FIG. 4 to meet the relation d1(x)+d2(x)+d3(x)=1. In other words, the sum is normalized without changing the ratio of d1:d2:d3.

Figure 5:
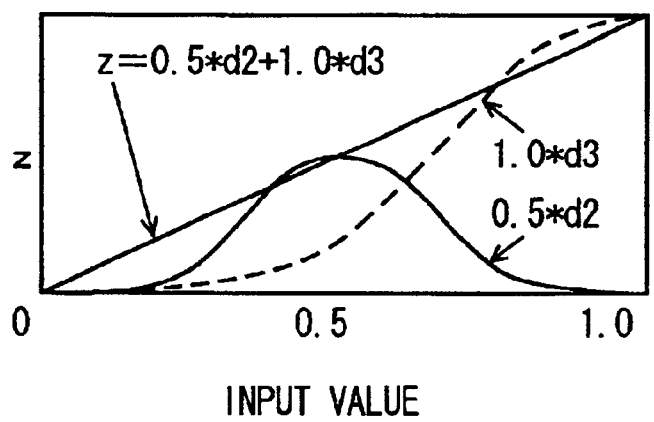

Further, function parameters are adjusted as shown in FIG. 5 to make output value z almost equal to input value x.

Namely, referring to FIG. 5, the function parameters are adjusted to establish a linear relation between output value z and input value x.

In step S105, one of a plurality of states is determined based on occurrence probabilities of respective states and thresholds (parameters).

In step S107, a signal having the state determined in step S105 is output. In step S109, based on whether each of the states occurs or not as determined in step S105, a predetermined initial threshold is corrected and then output.

Figure 6:
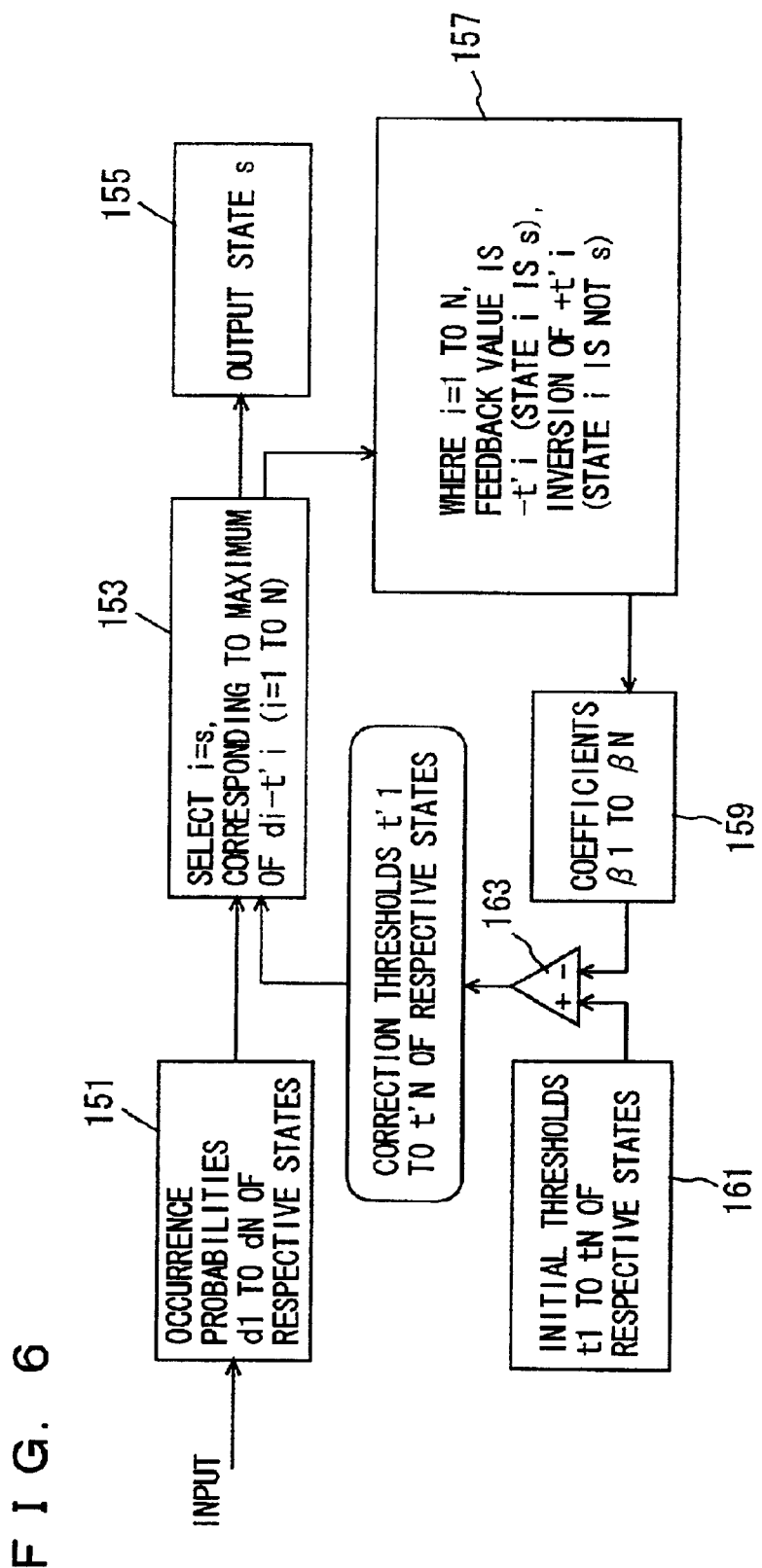
FIG. 6 is a block diagram showing a structure of the image processing apparatus implementing the first example of halftoning A.

FIG. 6 is a block diagram showing a structure of the image processing apparatus. Referring to FIG. 6, the image processing apparatus outputs one of N states (1–N) as an output state of one pixel. The image processing apparatus includes an occurrence probability setting unit 151 calculating occurrence probabilities d1–dN of respective states based on an input signal, a selecting unit 153 subtracting corresponding correction thresholds from respective occurrence probabilities to select a state corresponding to the maximum value of the values resultant from the subtraction, an output unit 155 outputting a signal representing the state selected by selecting unit 153, a calculating unit 157 calculating feedback values for respective states 1–N, a β multiplying unit 159 multiplying calculated feedback values by coefficients β1–βN respectively, an initial threshold output unit 161 outputting initial thresholds t1–tN for respective states, and a subtracter 163 subtracting the feedback value multiplied by the coefficient from the initial threshold. The output from subtracter 163 is the correction threshold to be supplied to selecting unit 153.

Figure 7:
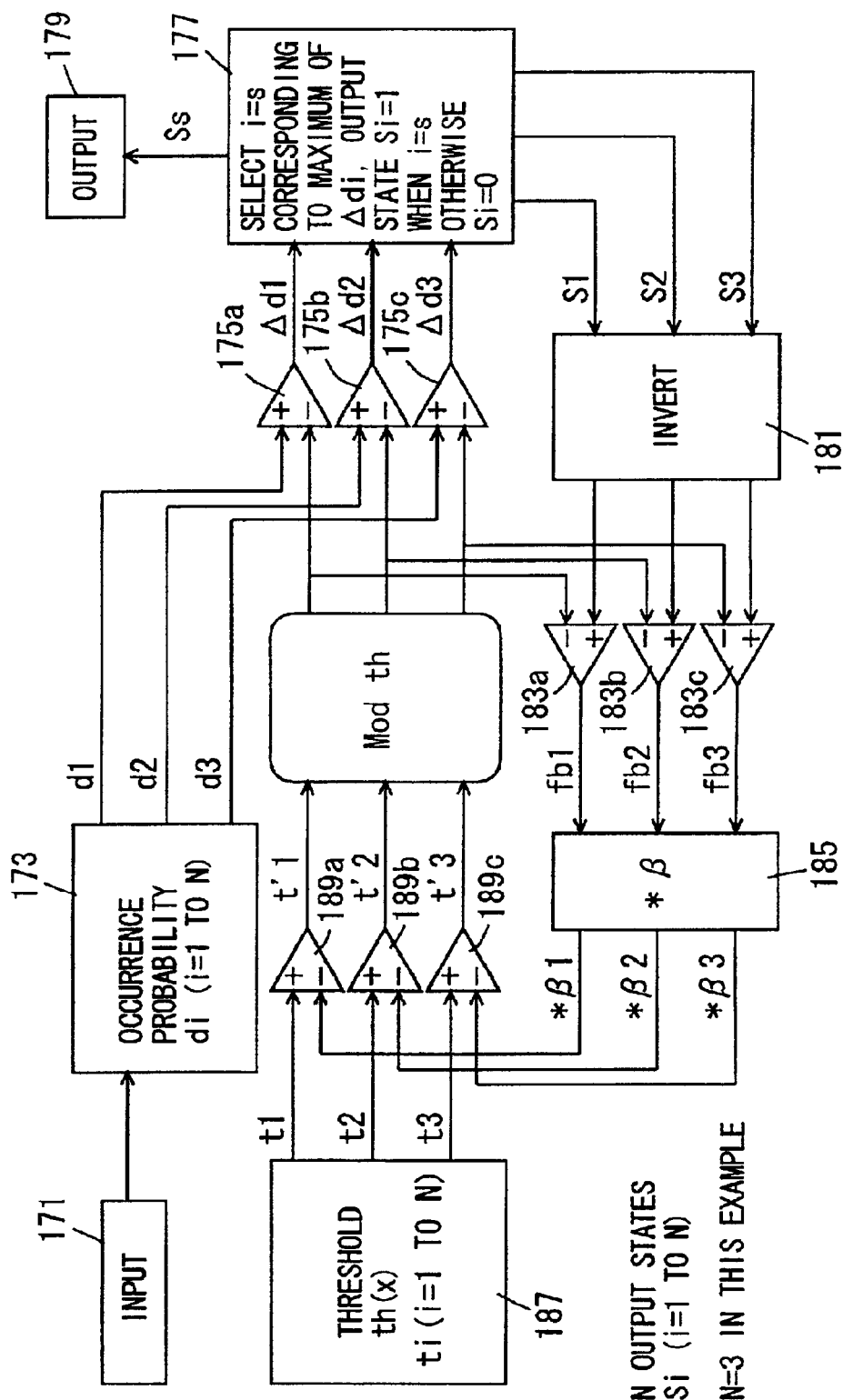
FIG. 7 is a more detailed block diagram of FIG. 6.

FIG. 7 is a block diagram showing in more detail the structure of the block diagram in FIG. 6. In FIG. 7, the number of states of pixels output from the image processing apparatus is 3 (N=3).

Referring to FIG. 7, the image processing apparatus includes an input unit 171 supplying a pixel value as an input signal, an occurrence probability setting unit 173 setting occurrence probabilities d1–d3 of respective states based on the input signal, subtracters 175a–175c subtracting correction thresholds t'1–t'3 respectively from occurrence probabilities d1–d3 of respective states, a selecting unit 177 selecting the maximum of respective outputs from subtracters 175a–175c as well as a state corresponding to the maximum, an output unit 179 outputting the selected state Ss, an inverting unit 181 inverting values S1—S1 resultant from selection by selecting unit 177, subtracters 183a–183c subtracting correction thresholds t'1–t'3 respectively from outputs of inverting unit 181, a β multiplier 185 multiplying outputs fb1–fb3 of respective subtracters 183a–183c by coefficients β1–β3, an initial threshold generating unit 187 outputting initial thresholds t1–t3, and subtracters 189a–189c subtracting outputs of β multiplier 185 respectively from initial thresholds t1–t3.

Outputs of subtracters 189a–189c are correction thresholds t'1–t'3 respectively. Selecting unit 177 outputs to inverting unit 181 "1" corresponding to a selected state and "0" corresponding to other states.

As shown, the number of occurrence probabilities and that of initial thresholds are each equal to the number N of output states. The number of feedback values fb1–fb3 for correcting the thresholds is also equal to N, which is the number of output states. The number of occurrence probabilities may be N–1 since the sum of occurrence probabilities (sum of d1–d3) is set to "1". The reason is that the remaining one occurrence probability can be calculated from N–1 occurrence probabilities.

If the sum of initial thresholds t1–tN or the sum of coefficients β1–βN is constant, the number of feedback values can also be reduced to N–1. The calculation amount can thus be decreased.

The initial thresholds supplied from initial threshold generating unit 187 may be different for respective output states or may be fixed (t1=t2=t3). The initial thresholds may alternatively have a pattern like dithering matrix. This pattern may be different depending on output states or may be the same.

Although the example shown in FIG. 7 is described as a method for determining an output state, another method may be employed that can determine an output state from a relation between thresholds and occurrence probabilities.

In addition, multiplication factor β used by β multiplying unit 185 may be varied for each output state or fixed. Alternatively, β may be changed according to use like changing of γ characteristics.

Figure 8:
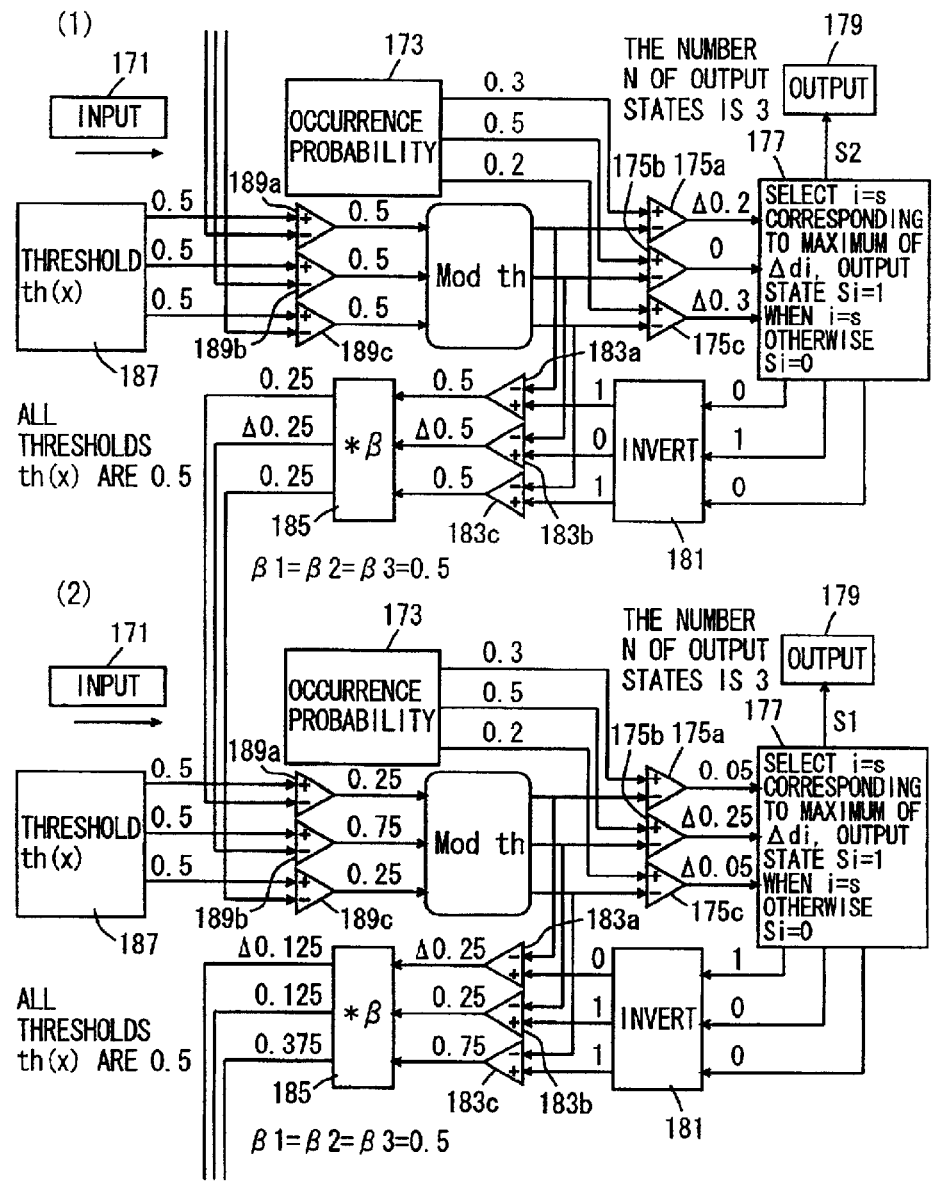
FIGS. 8 and 9 illustrate a process of the first example of halftoning A.
Figure 9:
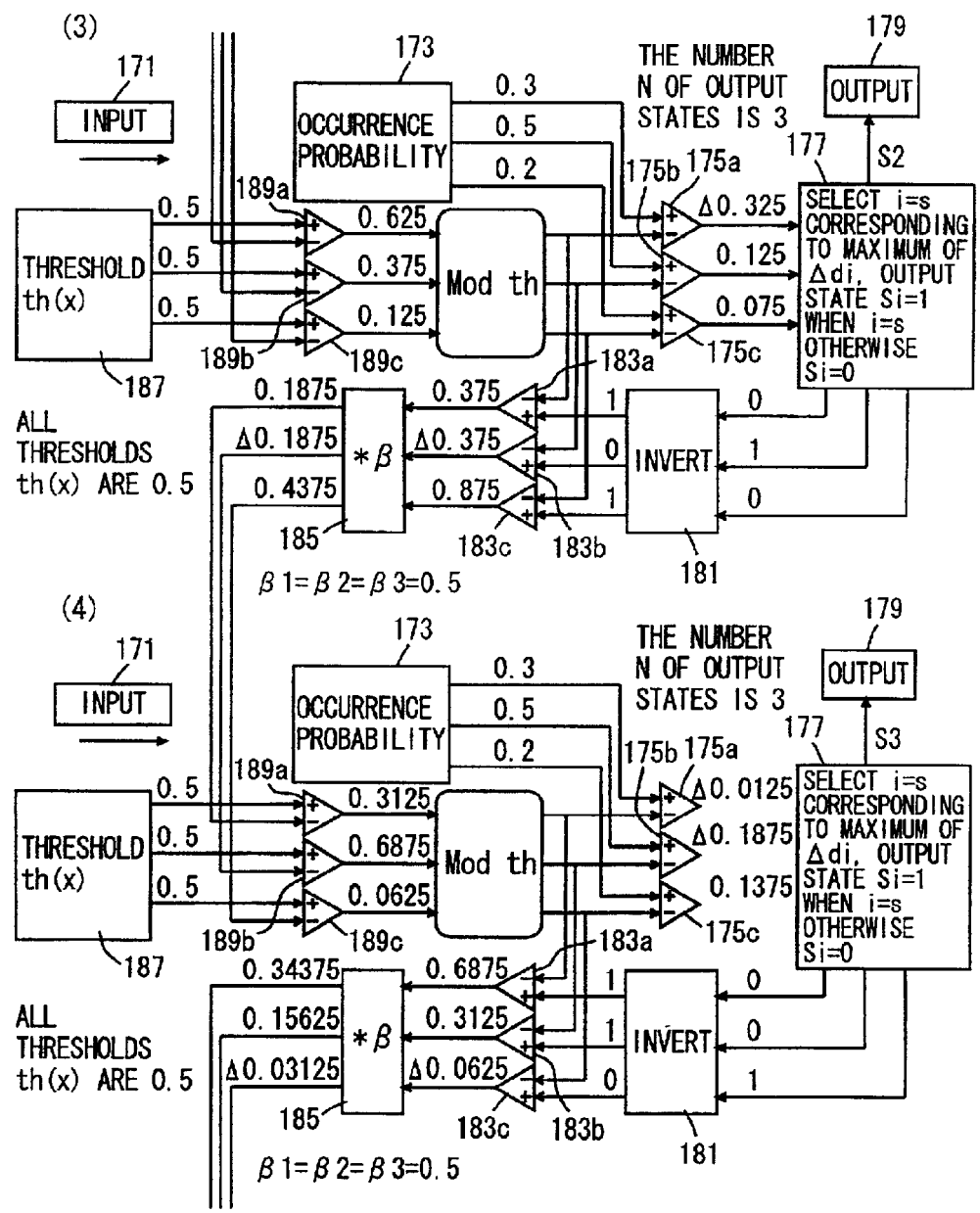

FIGS. 8 and 9 show a process of representing image data in a ternary form by the image processing apparatus. Referring to these drawings, input signals are processed in respective steps (1)–(4). The input signals here have the same value in all of the steps.

Referring to FIG. 8, in step (1), occurrence probabilities are determined according to an input signal. As discussed above, the occurrence probabilities may be determined by using table data for input signals or may be set by means of function based on the input signal. Here, occurrence probabilities for states 1–3 are set respectively to 0.3, 0.5 and 0.2.

Initial threshold generating unit 187 generates initial threshold 0.5 corresponding to all the states. Subtracters 189a–189c subtract outputs of β multiplier 185 that are calculated in a preceding stage from the initial threshold. Here, this step is the first stage, therefore, the preceding outputs of β multiplier 185 are 0.

Subtracters 175a–175c subtract the correction threshold from occurrence probabilities for respective states. Accordingly, subtracter 175a outputs −0.2, subtracter 175b outputs 0 and subtracter 175c outputs −0.3. The output of subtracter 175b has the maximum value, then selecting unit 177 selects state 2 (S2). Selecting unit 177 supplies to inverting unit 181 "1" corresponding to the selected state 2 and "0" corresponding to other states.

Inverting unit 181 inverts the output values from selecting unit 177. Subtracters 183a–183c subtract correction thresholds from outputs of inverting unit 181. Accordingly, subtracters 183a–183c output 0.5, −0.5 and 0.5 respectively.

β multiplier 185 multiplies the outputs of respective subtracters 183a–183c by coefficients β1–β3. Here, β1–β3 are all equal to 0.5 and then β multiplier 185 outputs 0.25, −0.25 and 0.25.

In the subsequent step (2), the outputs of β multiplier 185 that are calculated in step (1) are supplied to subtracters 189a–189c. After this, a similar process to that as described in conjunction with step (1) is performed in step (2). The processes in steps (3) and (4) are also similar to that.

For easy understanding of description, the processes shown in FIGS. 8 and 9 and processes shown in FIG. 10 discussed below are illustrated in which feedback is given to a single pixel which has not been processed. However, in an actual process, weighted feedback is given to a plurality of un-processed pixels in a two-dimensional manner.

FIG. 10 shows an example of calculation different from the example shown in FIGS. 8 and 9. In the steps (1)–(12) shown in FIG. 10, the number N of output states is 3, input signals have the same value and occurrence probabilities of respective three states are 0.4, 0.5 and 0.1. Initial thresholds are all 0.5 and all coefficients β are also 0.5.

The halftoning discussed here can output a plurality of output states exhibiting, as a whole, characteristics that reflect input signals. Further, the output states can uniformly be distributed.

For example, when the gray scale of an image is represented in a plurality of output states, a visually uniform texture can be provided while a plurality of output states are mixed all the time.

This halftoning does not have problems such as texture shift and pseudo outline as occurring in the error diffusion. If different color materials are provided corresponding to a plurality of output states, arbitrary combinations of color materials can be arranged according to the number of output states and the color combinations can uniformly be arranged. These effects of the halftoning can enhance the quality of an output image.

The reason why this halftoning A can achieve such effects is described below. A method like the conventional error diffusion, for example, minimizes an average error in any cases of a simple binarization and error diffusion in a vector space. In other words, this method functions to produce a certain state of a target pixel by averaging of the target pixel and peripheral pixels. Then, the output state of the target pixel has a strong relation with the output state of a neighboring pixel.

On the other hand, this halftoning sets the occurrence probabilities of respective output states in advance to fulfill the occurrence probabilities among other things. Namely, an output does not depend on the output state of a neighboring pixel. The highest priority is assigned to representation of an output state with the set probability.

For example, if input signals have a fixed value of 0.5 and there are three (N=3) output states A=0, B=0.5 and C=1, only the output state B occurs in the case of the error diffusion method aiming at averaging.

Specifically, if state A is output, it is highly probable that the output state occurring subsequently is C. In this way, outputs are determined such that the average thereof approaches 0.5. On the other hand, this halftoning A attaches the top priority to occurrence probabilities and thus does not have such a dependency.

Suppose that occurrence probabilities of A, B and C are set respectively to 25%, 50% and 25%. If A is output for example, it is highly probable that the subsequent output is not A, however, the probability that C occurs is not high. The occurrence probability of B is still 50%. In other words, the output does not depend on the fact that A is output.

Substantially there is no such a difference when the number of output states is two, i.e., binarization is performed. This difference is observed when the number of output states is three or more. If the number of output states is two, one determined state automatically determines the other state. Therefore, the different methods provide the same result in the end.

When the number of output states is three or more, different results are achieved by respective methods. However, both of these methods reproduce an input as a whole. They are different in the arrangement of dots in terms of a microscopic output state.

Namely, these methods are different in the fine structure of output states of adjacent pixels. According to halftoning A, output states of pixels adjacent to each other have no strong relation. In other words, the output states are arranged relatively independent of each other. The output states can thus be uniformly distributed over a two-dimensional pixel arrangement to achieve a visually natural image.

Second Example of Halftoning A

Figure 11:
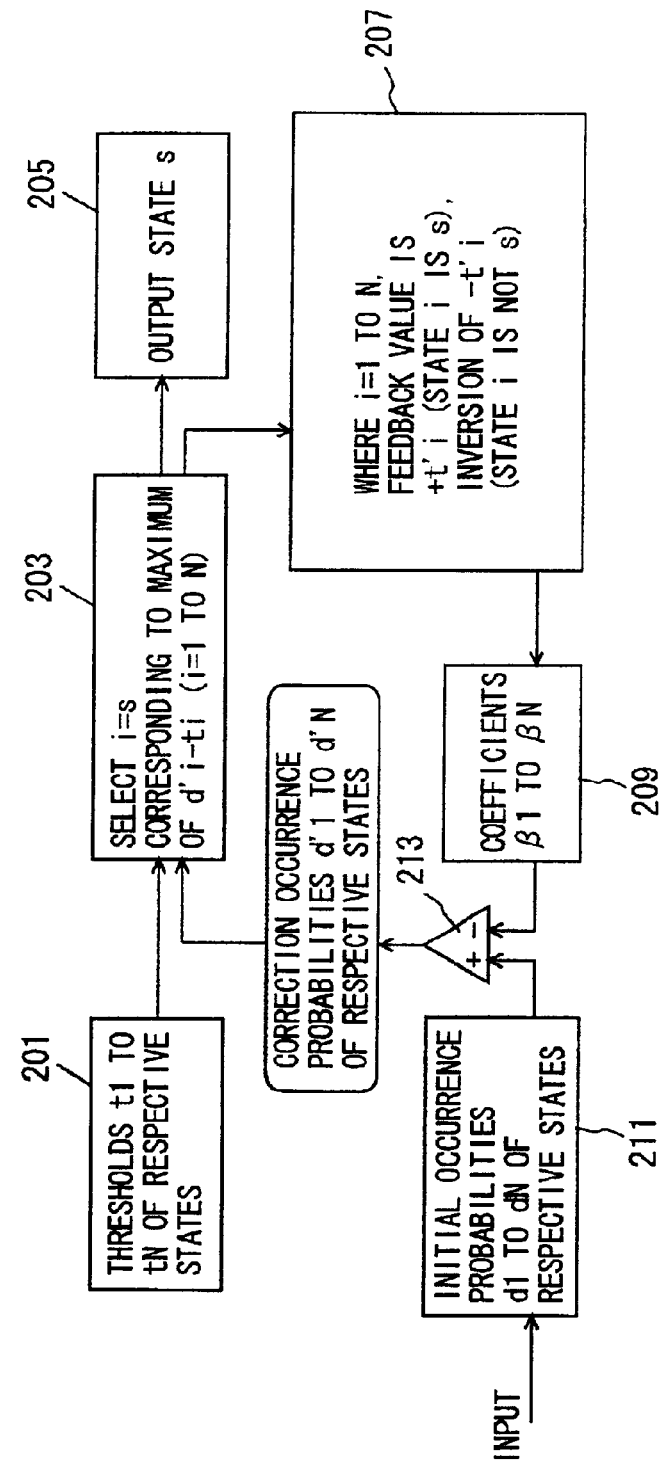

FIG. 11 is a block diagram showing a structure of an image processing apparatus implementing a second example of halftoning A. The image processing apparatus shown in FIG. 6 calculates a feedback value by deciding whether a parameter (correction threshold) is inverted or not to determine the sign thereof, based on a determined output state, and a parameter is corrected according to the calculated feedback value. Alternatively, an occurrence probability may be corrected based on a calculated feedback value as shown in FIG. 11.

Specifically, referring to FIG. 11, initial occurrence probabilities d1–dN are calculated by using a data table or the like based on an input signal, correction is made based on feedback values by a subtracter 213, and then corrected occurrence probabilities d'1–d'N are generated to allow a selecting unit 203 to select a state corresponding to the maximum of d'i–ti.

This example also achieves the effects like those of the first example of halftoning A.

Third Example of Halftoning A

Figure 12:
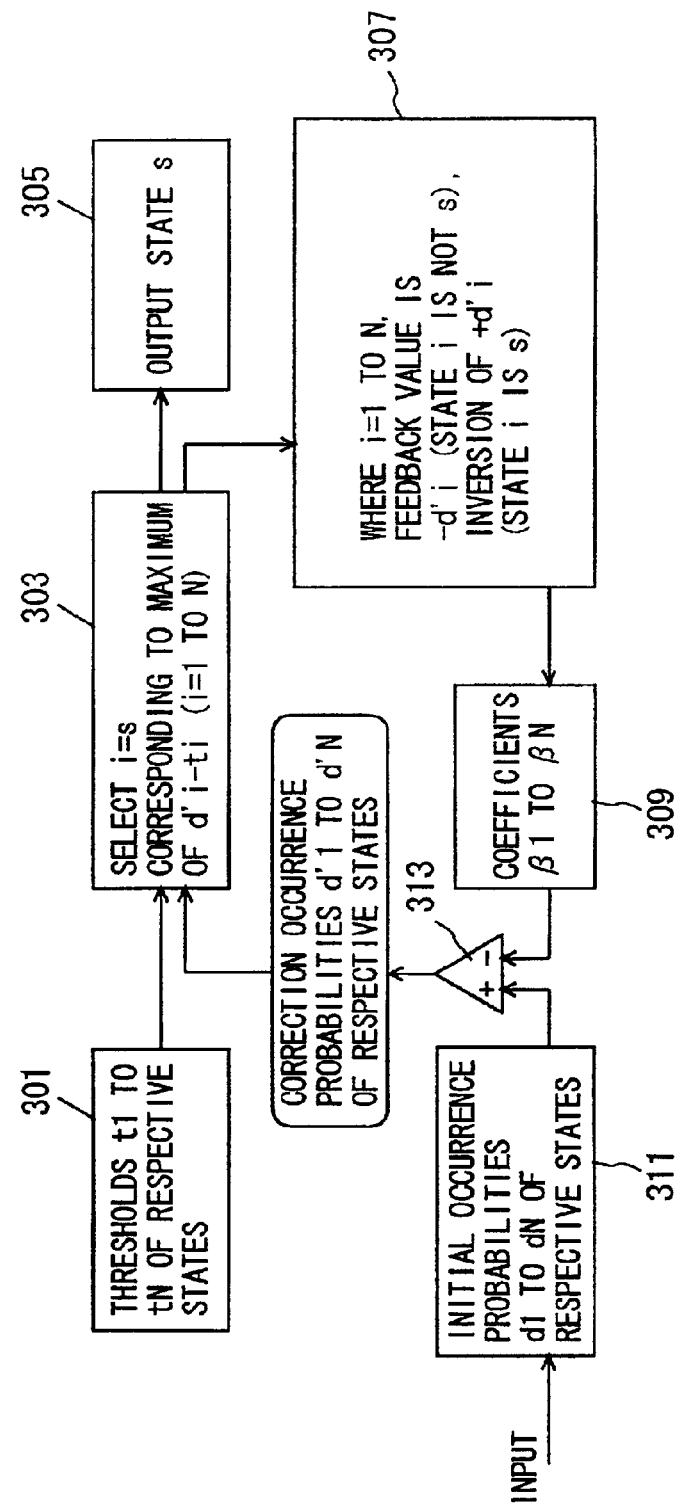

FIG. 12 is a block diagram showing a structure of an image processing apparatus implementing a third example of halftoning A. In this example, a feedback value is calculated by deciding whether an output probability is inverted or not to determine the sign thereof, based on a determined output state, and then an output probability is corrected based on the calculated feedback value.

In other words, a calculating unit 307 uses an inverted version of d'i, as a feedback value corresponding to a selected occurrence probability, and −d'i is used for other feedback values.

The third example also accomplishes the effects similar to those of the first example.

Fourth Example of Halftoning A

Figure 13:
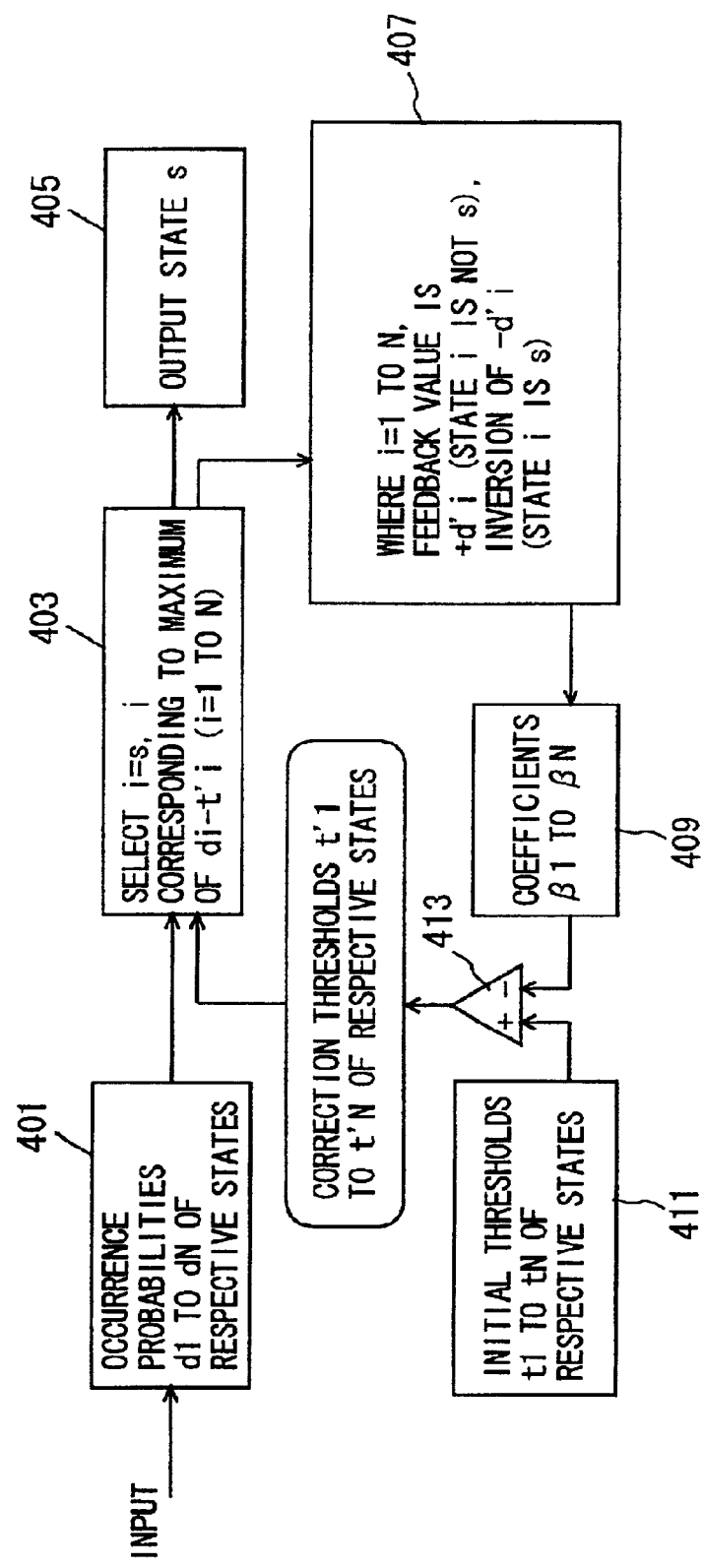

FIG. 13 is a block diagram showing a structure of an image processing apparatus implementing a fourth example of halftoning A.

In this example, a feedback value is calculated by deciding whether an occurrence probability is inverted or not to decide the sign thereof based on a determined output state, and the feedback value thus calculated is used for correcting a parameter.

The apparatus thus structured can also achieve the effects similar to those of the first example.

Sample of Output by Halftoning A

Figure 14:
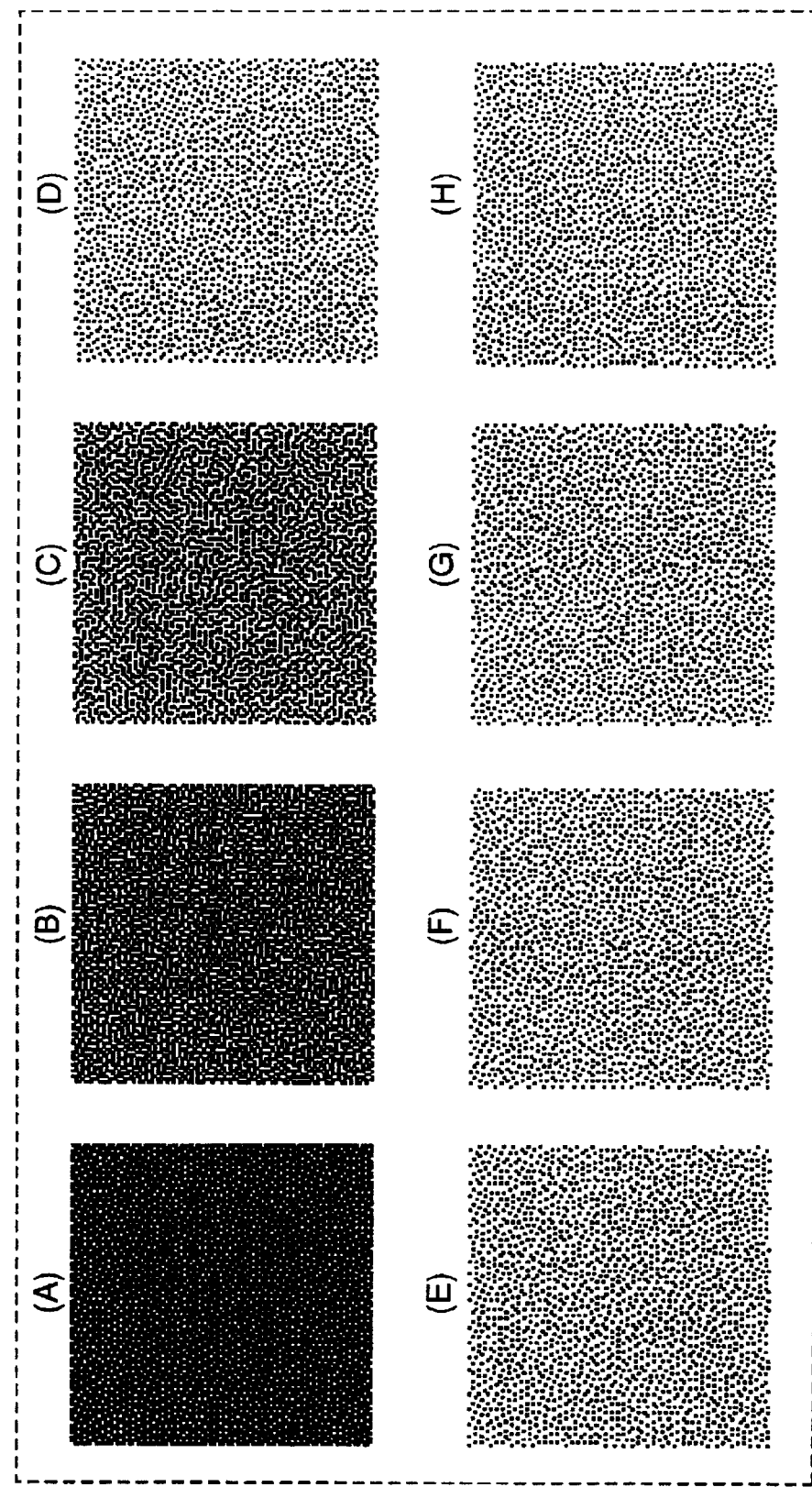
FIG. 14 shows output image samples.
Figure 15:
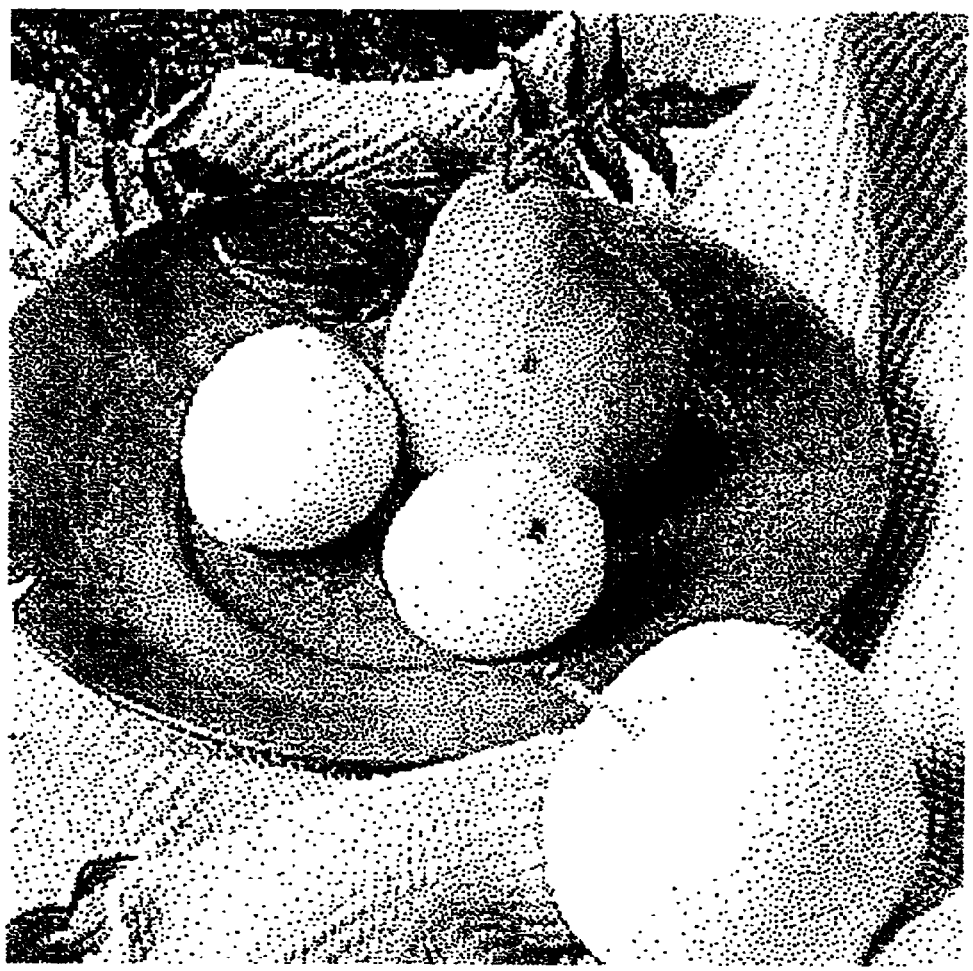
FIGS. 15–22 respectively show first to eighth output results of a natural image.
Figure 16:
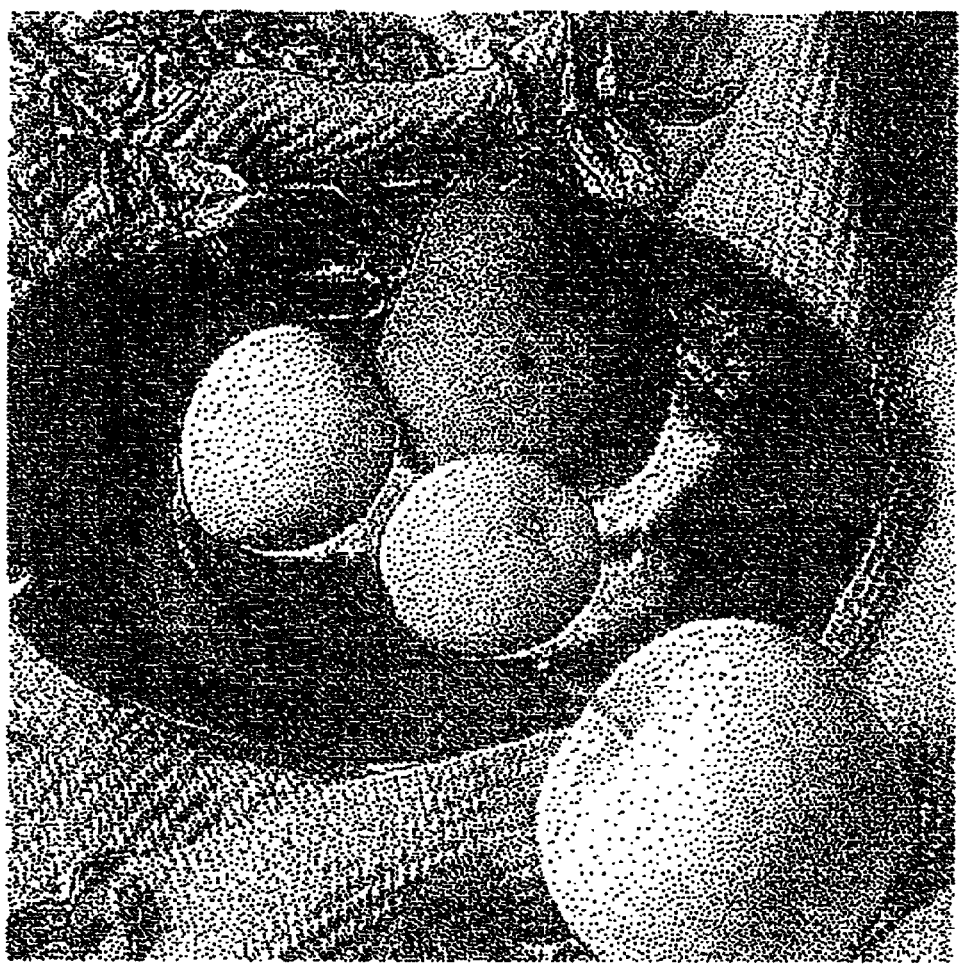
Figure 17:
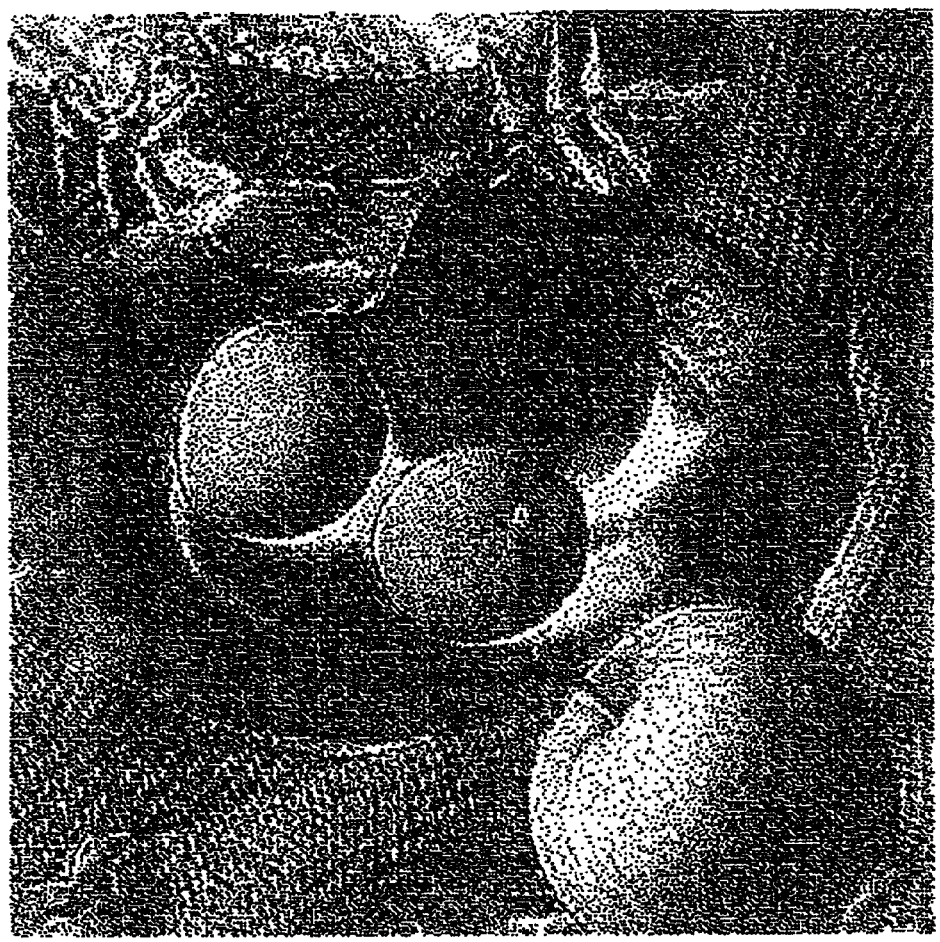
Figure 18:
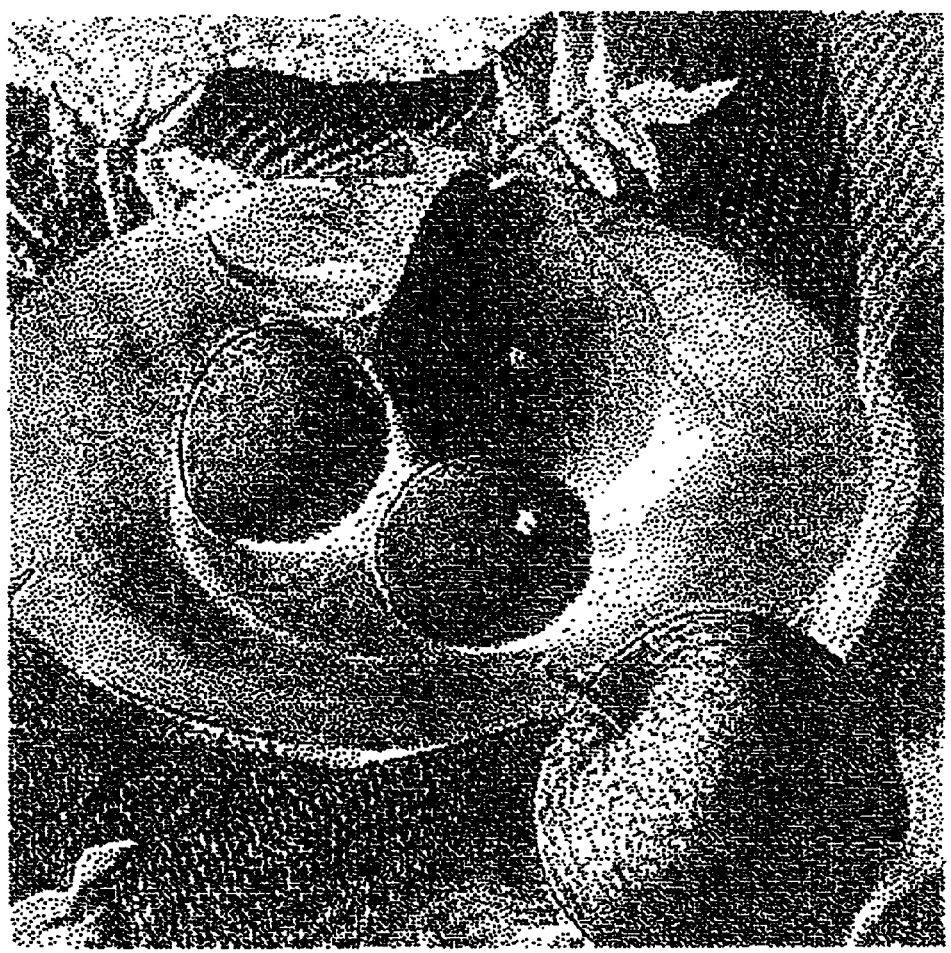
Figure 19:
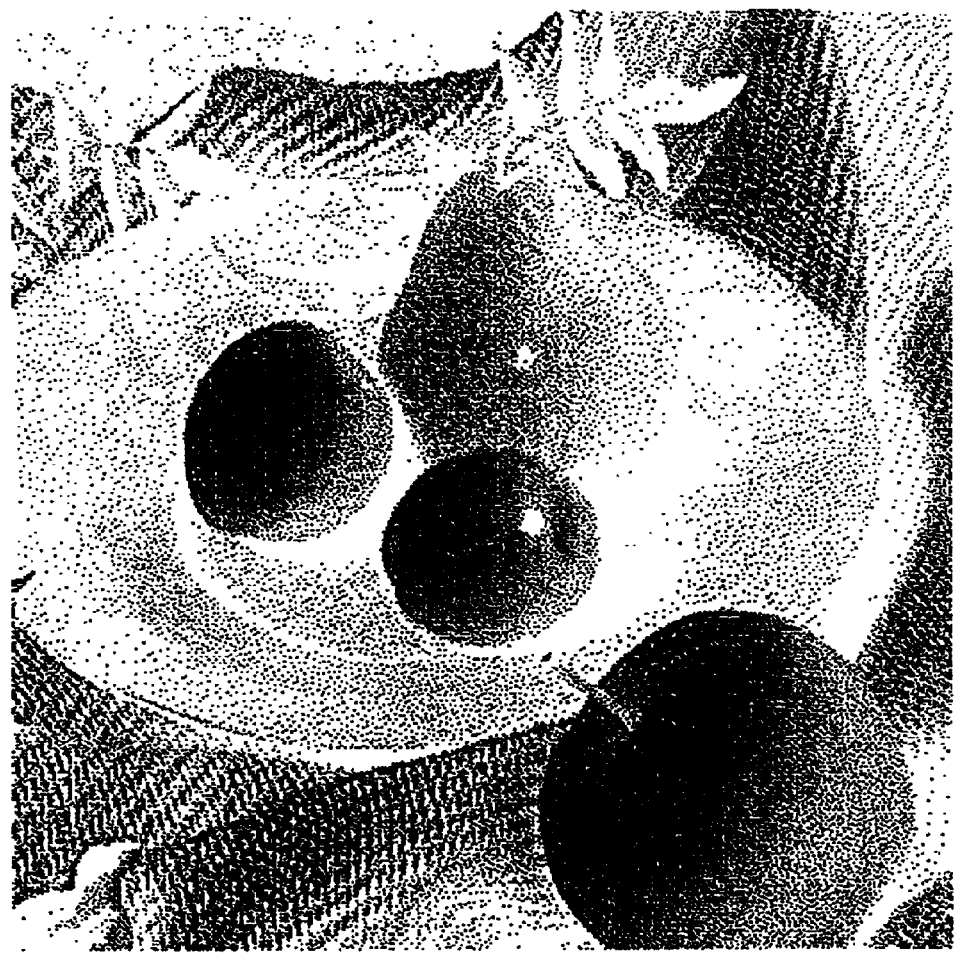

FIG. 14 shows samples output through halftoning A. Here, an input image to be processed is formed of 100×100 pixels having a uniform density. This input image is converted into image data having 5 states, i.e., the number N of output states is 5 (N=5). The five states have the same occurrence probability.

In (D)–(H) of FIG. 14, pixels of output states 1–5 are represented by black dots. (A) shows pixels of output states 1–4 with black.

(B) shows pixels of output states 1–3 with black. (C) shows pixels of output states 1 and 2 with black.

As shown, pixels where respective output states occur are uniformly distributed. With respect to one output state, there is no inclination that any specific output state is likely to occur at a pixel adjacent to a pixel of that one output state.

In other words, regarding these output samples, with respect to a region of the same input state (region having the same gray level), at least three output states are mixed and these output states are evenly distributed.

Another example is shown below in which a natural image of 512×512 pixels undergoes image processing of halftoning A. It is supposed that the number N of output states is 5 (N=5) and a combination of occurrence probabilities of respective output states with respect to an input signal of 0 to 1 satisfies the following equation (1).

$$\text{input value} = 0 \times d1 + 0.25 \times d2 + 0.5 \times d3 + 0.75 \times d4 + 1 \times d5 \ldots \quad (1)$$

$$(d1 + d2 + d3 + d4 + d5 = 1)$$

It is a condition always required that the sum of occurrence probabilities of respective output states is 1. Other conditions can arbitrarily selected.

FIGS. 15–22 show pixels where respective states occur by black dots. FIGS. 15–19 show output states 1–5 respectively.

Figure 20:
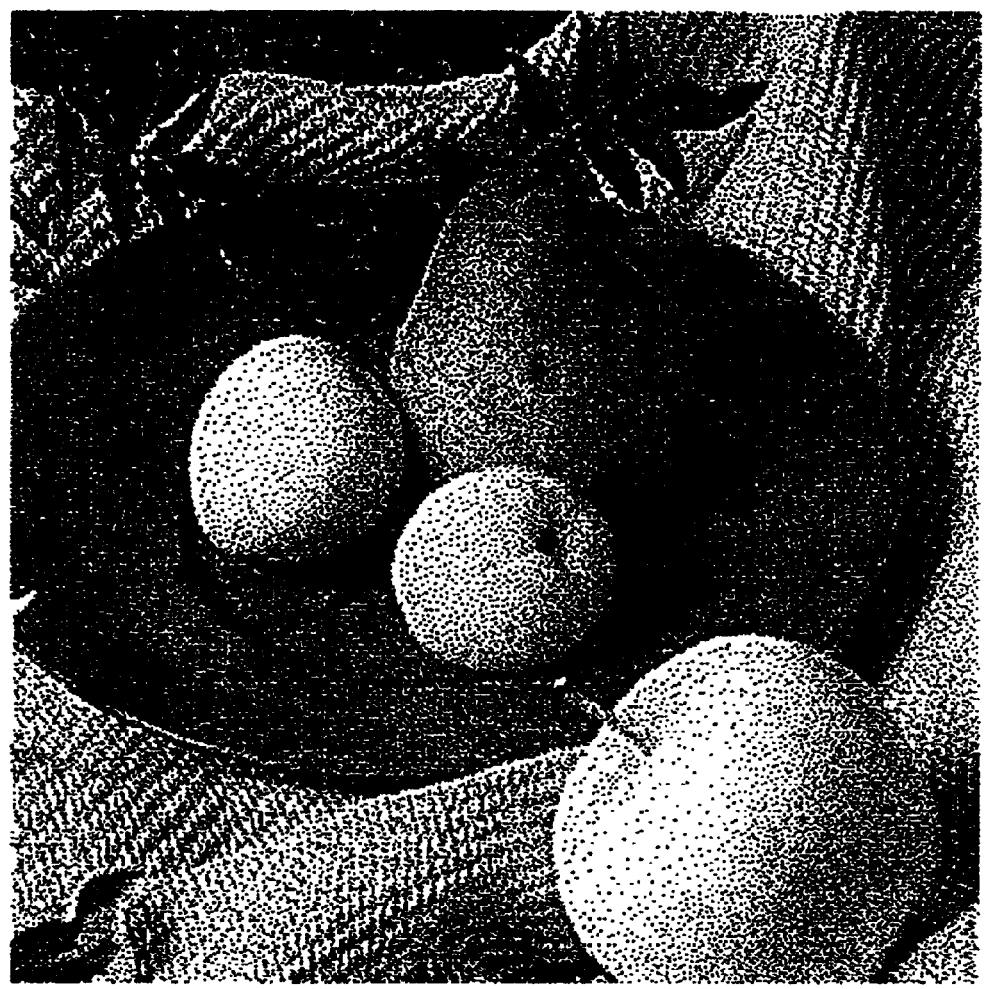
Figure 21:
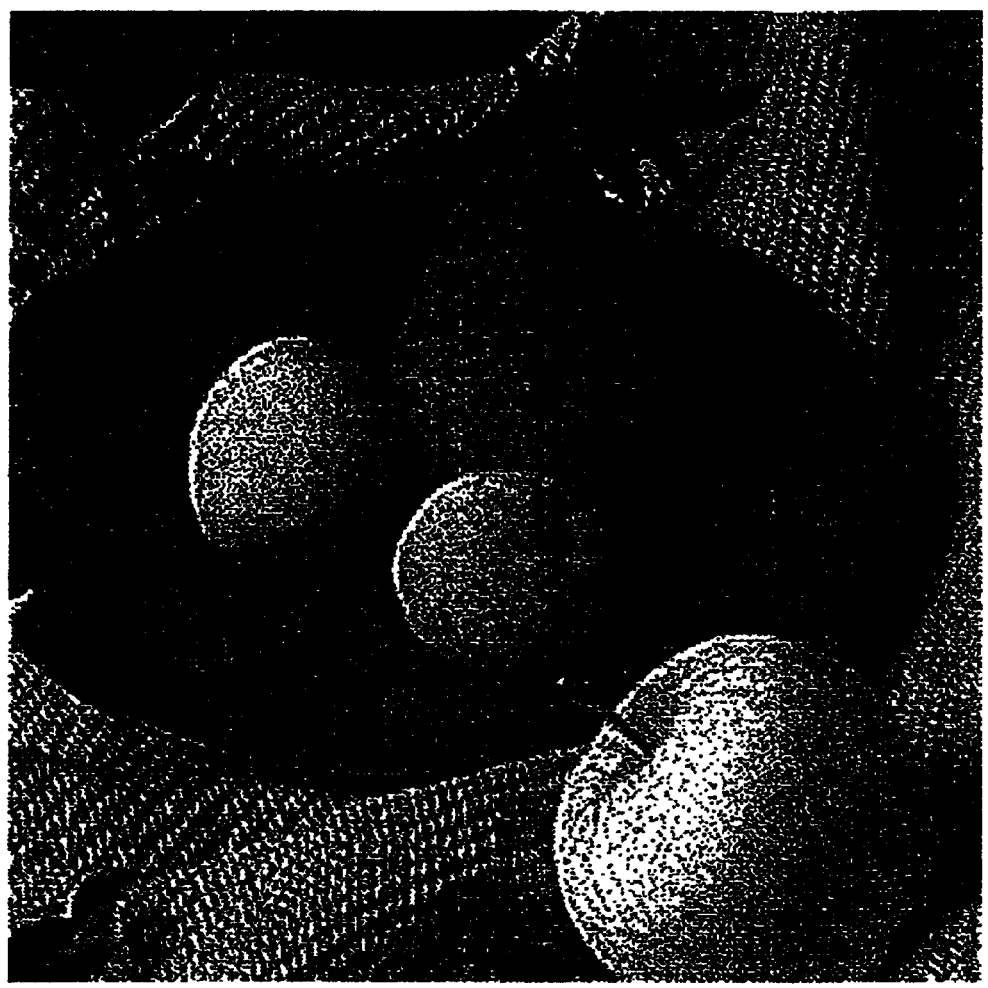
Figure 22:
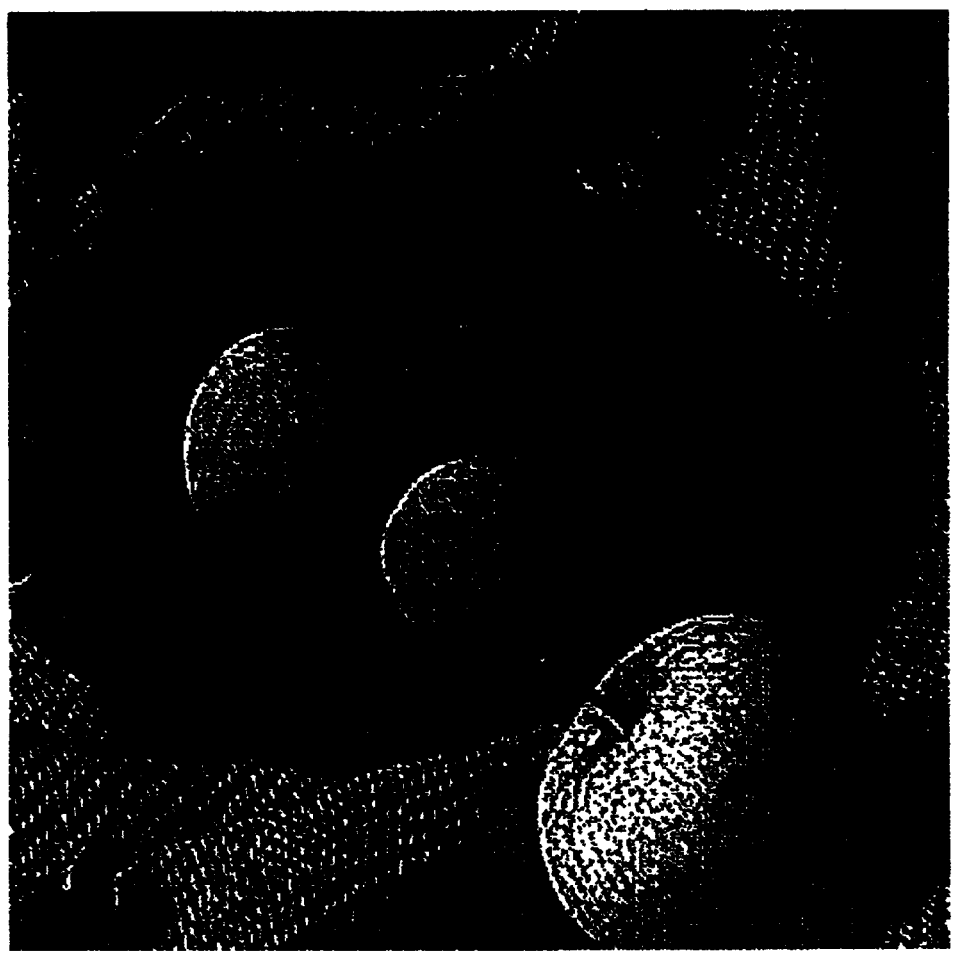

FIGS. 20, 21 and 22 respectively show the combination of output states 1 and 2, that of output states 1–3 and that of output states 1–4.

When all of the output states 1–5 are combined, pixels are all represented by black (not shown). It can be seen from FIGS. 15–22 that pixels where respective output states occur are uniformly distributed and the occurrence probabilities effectively contribute to reproduction of the natural image.

Example of Halftoning B

Figure 23:
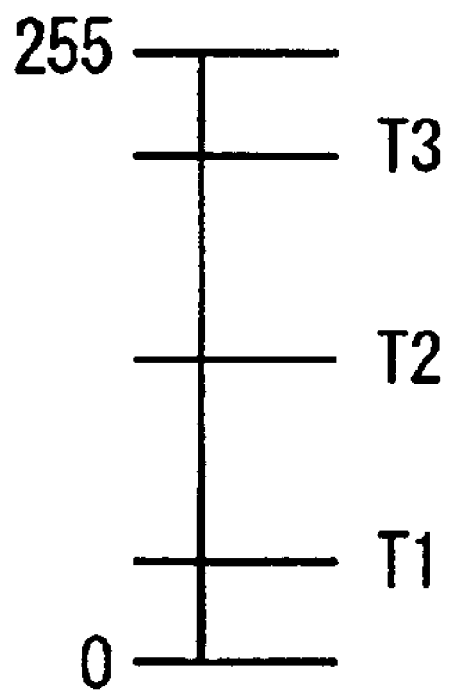
FIG. 23 illustrates a process of halftoning B.

A specific example of halftoning B is described below. FIG. 23 illustrates a process of converting an image of N levels output through halftoning A into a 4-level image by halftoning B.

As shown, three (4−1=3) thresholds (T1, T2, T3) are set and these thresholds are used for making decision to divide the N-level input image (N is 0 to 255) into four regions and resultant output values of 4 levels are generated.

Although the process of halftoning B should be performed by each output device, fixed thresholds are used for decision. Therefore the load on this process is relatively light and a high processing speed is implemented. The load on halftoning A is relatively heavy, however, the process of halftoning A may be performed just once on the host side. In addition, use of halftoning A can remarkably reduce the volume of an image to be transmitted.

Figure 24:
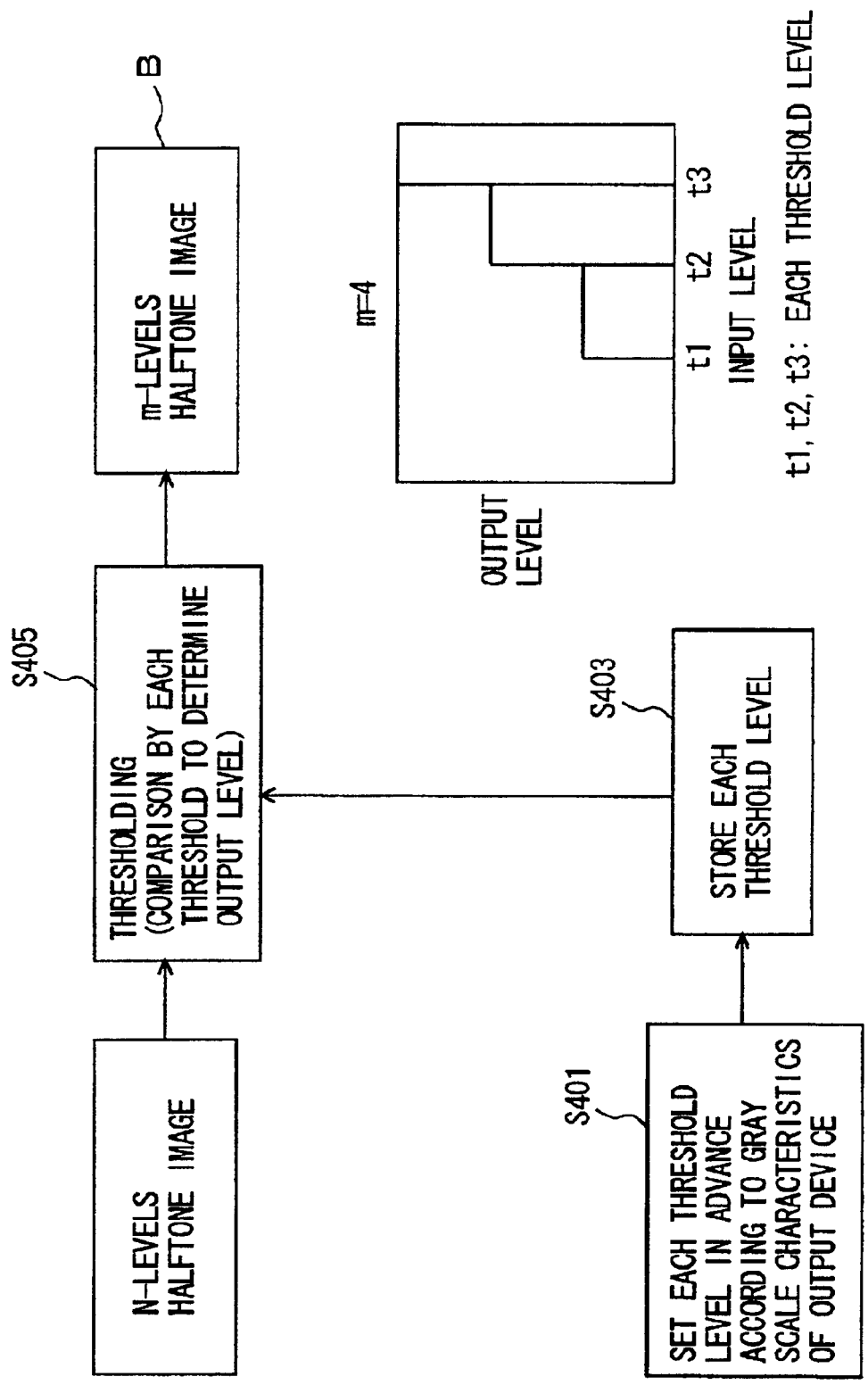
FIG. 24 illustrates a specific process of halftoning B.

FIG. 24 more specifically illustrates halftoning B. In step S401, threshold levels are preliminarily set according to gray scale characteristics of an output device. In step S403, the set threshold levels are stored.

When a halftone image of N levels is input through a network, thresholding is performed in step S405 by comparing each threshold with a pixel value of one pixel to determine an output level. In this way, a halftone image B of m levels can be generated.

If m is equal to 4 (m=4) as shown in the lower right part of FIG. 24, three thresholds t1, t2 and t3 may be set.

As discussed above, according to this embodiment, halftoning is carried out in two stages, the first stage being halftoning A before transmission of image data and the second stage being halftoning B after image data transmission. Although the conventional technique shown in FIG. 40 also employs two-stage halftoning, the conventional halftoning technique cannot provide a number of mixed output states like implemented by halftoning A. As a result, the conventional technique has a problem that the image quality deteriorates when 2-stage halftoning is performed. The reason for this is explained below.

The conventional technique represents a certain input gray level x by m levels by merely using two levels ($L_k$, $L_{k+1}$) that are closest to x.

Figure 25:
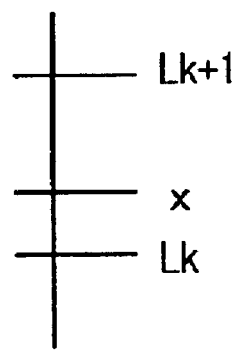
FIG. 25 illustrates a problem of a conventional art.

Specifically, referring to FIG. 25, according to this conventional technique, for a uniform pattern of input x, only two levels ($L_k$, $L_{k+1}$) with input x therebetween are used as output states of this pattern. In other words, the ratio between these two levels present are used for weighting and averaging and a resultant value is used for expressing input value x.

Figure 26:
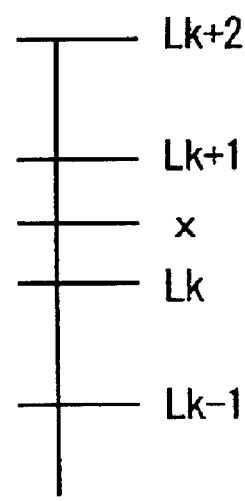
FIG. 26 illustrates effects of the present invention.

Referring to FIG. 26, according to this embodiment, for a uniform pattern of input x, halftoning A is performed not only by using two levels ($L_k$, $L_{k+1}$) with x therebetween but also by designating occurrence probabilities. Then, other levels (for example $L_{k-1}$, $L_{k+2}$) are further mixed freely to express input x as a whole.

Figure 27:
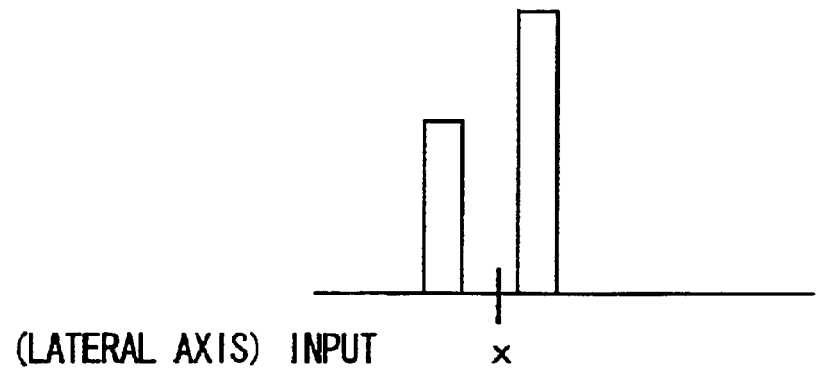
FIG. 27 illustrates a conventional halftoning process.
Figure 28:
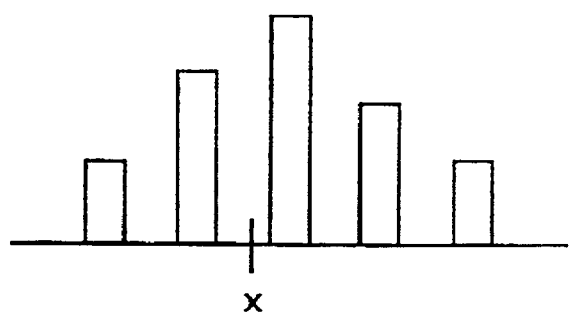
FIG. 28 illustrates a resultant output through halftoning A.

More specifically, referring to FIGS. 27 and 28 showing histograms respectively, when a uniform pattern of input x is supplied, the input value is reproduced by two levels on both sides of x in the conventional technique as shown in FIG. 27.

According to the present invention as shown in FIG. 28, not only two levels on both sides of input x but other levels of pixels are used to reproduce the input value.

Halftoning A can thus express input value x with many levels mixed. Therefore, even if the gray levels are reduced by a subsequently applied thresholding process (halftoning B), the image quality can be maintained well.

As for the conventional technique, halftoning is employed for implementing multiple values. However, in the limited example of input value x, only two levels are used for expressing an image. Reduction of gray levels after this halftoning appears nonrealistic. Once the number of gray levels is decreased, the conventional technique cannot achieve gray level conversion for the second time unless the image is reproduced as an image close to a continuous-tone image.

Another important condition is necessary for outputting an image of good quality. In order to express input value x by a mixture of a number of output levels, not only reproduction of input value x as a whole, but also an arrangement of uniformly distributed pixels of respective levels to form an image is required.

FIG. 28 presents this feature as a histogram. When pixels having each output level are arranged to concentrate in a certain region on an image, this irregularity appears as noise visually. Then, it is necessary that there are pixels of multiple output levels while these pixels are mixed and uniformly distributed. Halftoning A can provide such an image satisfying this requirement.

Halftoning A discussed above may be implemented by any halftoning if the halftoning can produce an image satisfying the requirements above.

Sample of Image Output

A process is described below of converting a distribution image A into an output image B according to this embodiment, in conjunction with specific images as examples. Distribution image A is a gray scale image of 28×25 pixels having a uniform density. Distribution image A is converted through halftoning A into an N-level (N=12) image, N being the number of output states. A resultant image is shown in FIG. 29.

Figure 29:
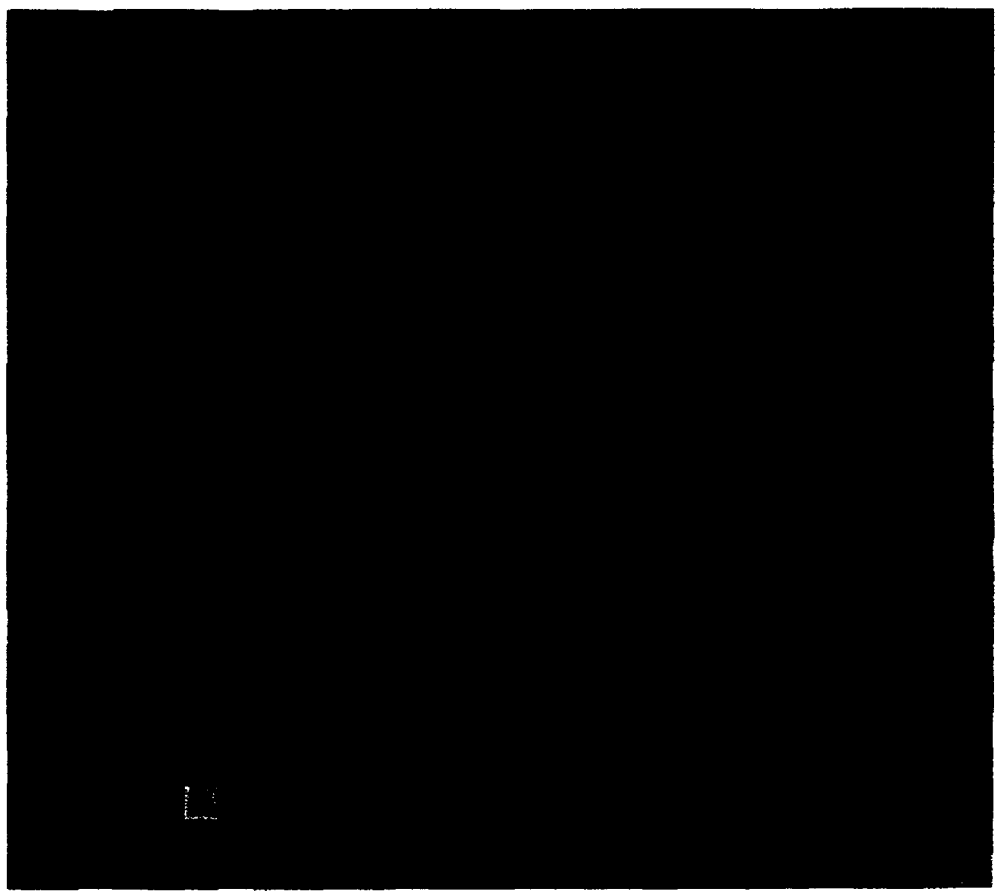
FIG. 29 shows an image processed through halftoning A.
Figure 30:
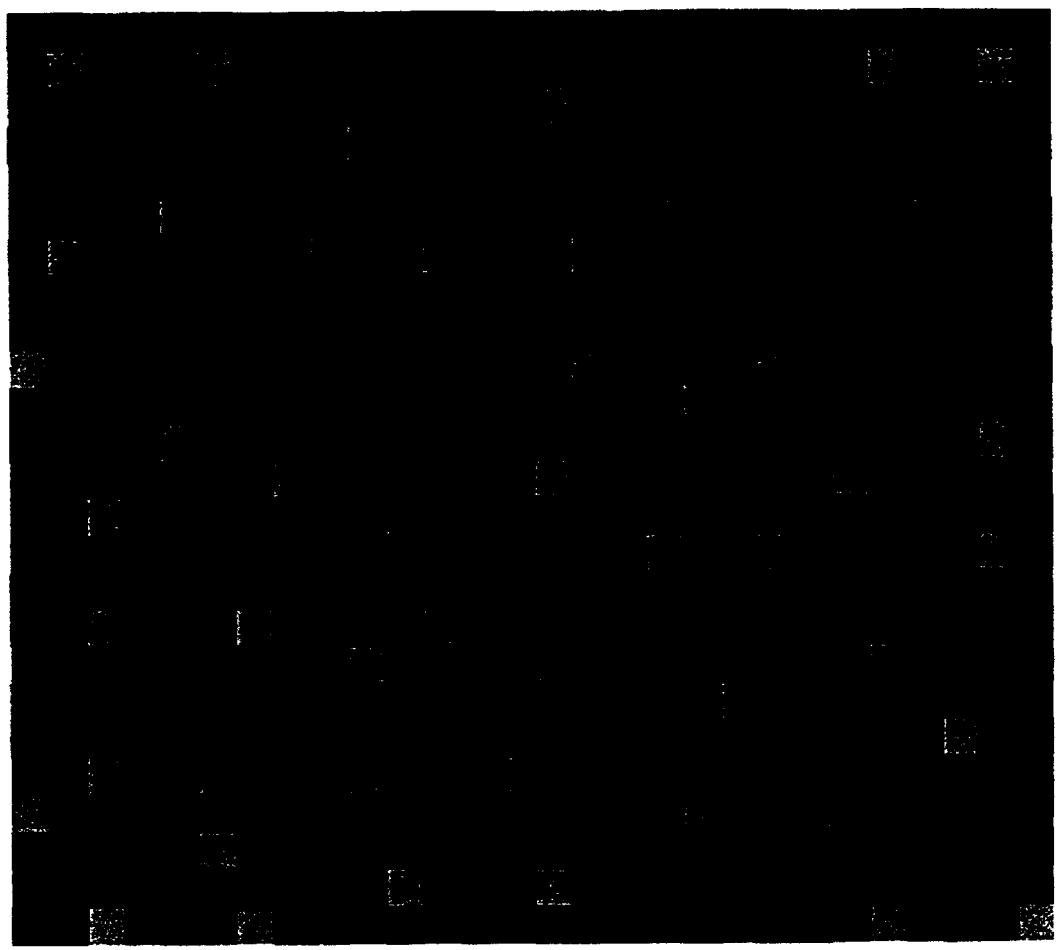
FIG. 30 shows a six-valued image generated by processing the image in FIG. 29 through halftoning B.
Figure 31:
FIG. 31 shows a four-valued image generated by processing the image in FIG. 29 through halftoning B.
Figure 32:
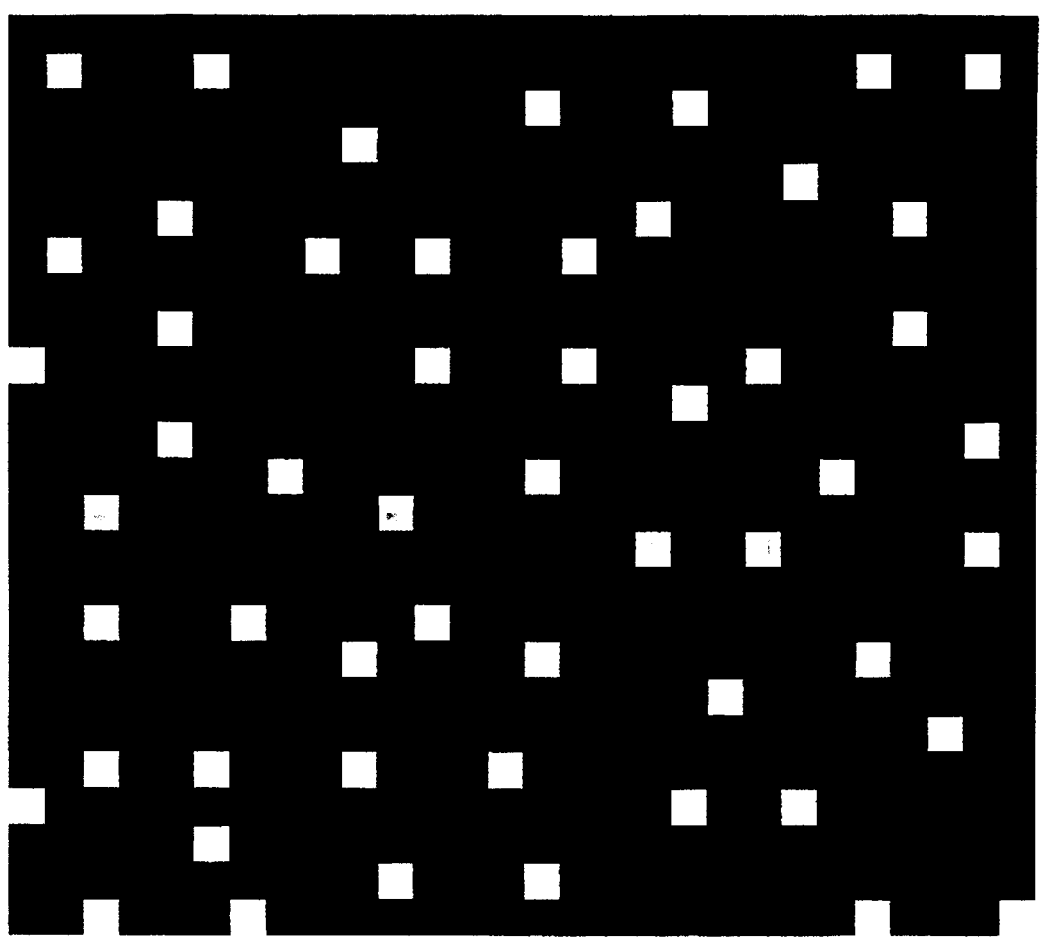
FIG. 32 shows a ternary image generated by processing the image in FIG. 29 through halftoning B.
Figure 33:
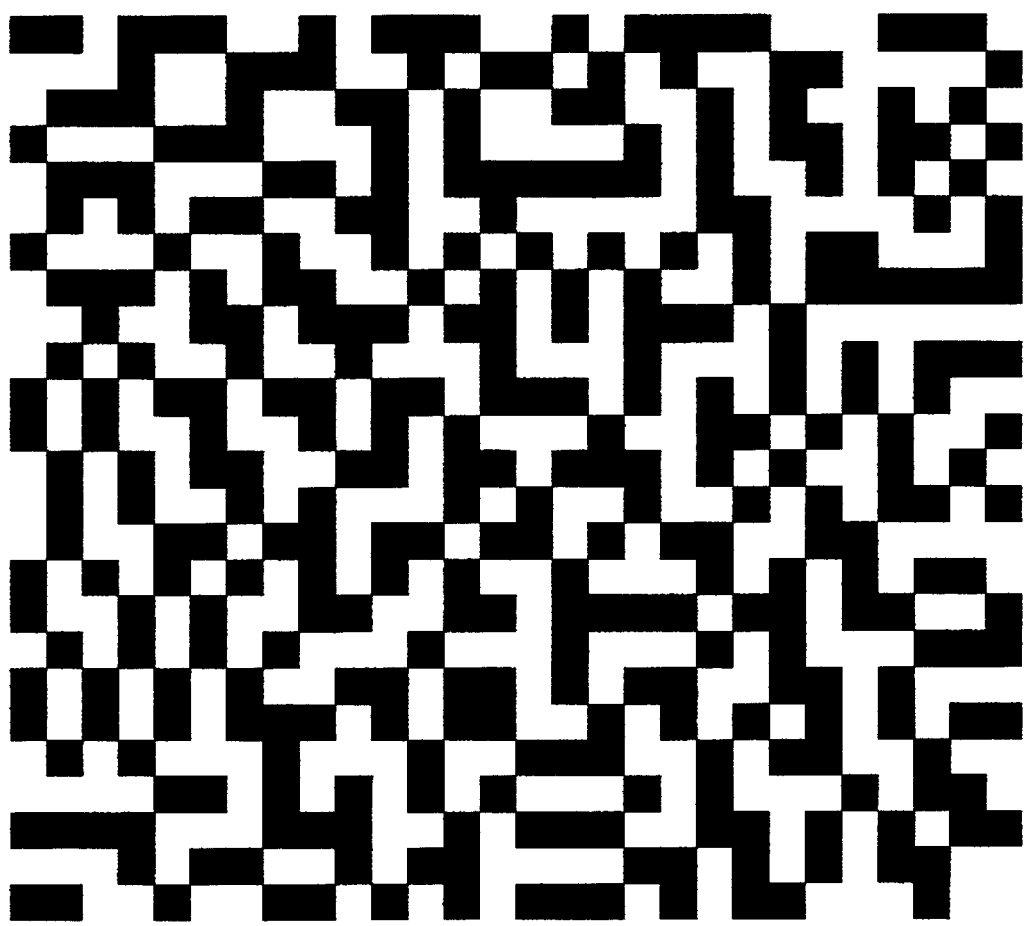
FIG. 33 shows a binary image generated by processing the image in FIG. 29 through halftoning B.

Referring to FIG. 29, there is a possibility that 12 gray levels are mixed. However, because of low occurrence probabilities of levels away from the median, i.e., levels close to black and white, compared with levels close to the median, actually the number of levels appearing in the range of 28×25 pixels is smaller than 12.

The image shown in FIG. 29 undergoes halftoning B and resultant images are shown in FIGS. 30–33. The number of output levels of each image is 6 in FIG. 30, 4 in FIG. 31, 3 in FIG. 32 and 2 in FIG. 33.

As shown in FIGS. 30–33, output images with the number of output levels smaller than 12 and differing from each other can readily be generated from one image of 12 levels (FIG. 29).

More specifically, image processing is described that is performed for a distribution image of 256 gray levels.

Figure 34:
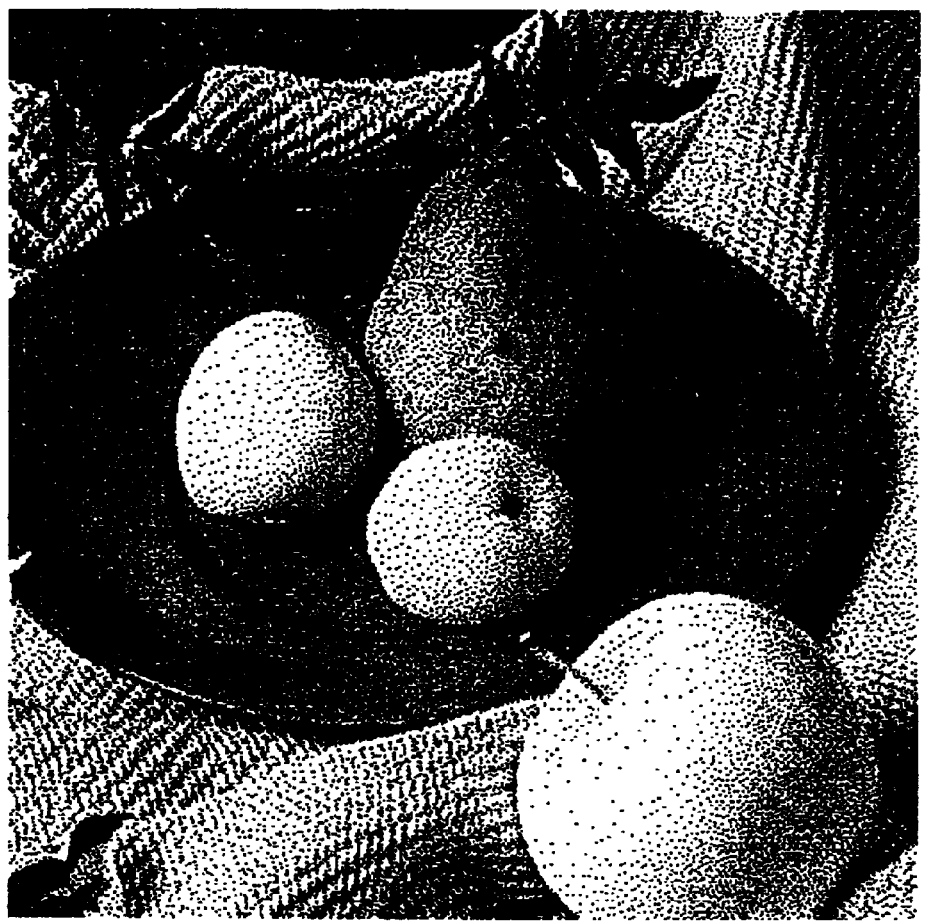
FIG. 34 shows an image output by the method of forming a halftone image according to the embodiment.

According to this embodiment, halftoning A and halftoning B are used to process the distribution image and a resultant image is shown in FIG. 34. In this example, halftoning A implements conversion from 256 into 12 levels and halftoning B implements conversion from 12 to 2 levels.

As seen from this image, this embodiment can reproduce an original image highly precisely while two halftoning processes are performed.

Figure 35:
FIG. 35 shows a resultant output of an image according to a conventional technique.

Using error diffusion method, an original image of 256 gray levels is halftoned into 12 levels and further into 2 levels, and a resultant image is shown in FIG. 35. As shown, this conventional technique has a difficulty in tone reproduction of the original image when halftoning is performed in two stages.

Figure 36:
FIG. 36 shows a simple binary image generated from a multi-valued image.

An original image of 256 gray levels is binarized through halftoning B only and a resultant image is shown in FIG. 36. Tone reproduction of the original image is difficult when only halftoning B is performed. According to this embodiment, halftoning A is used first to distribute output states of respective pixels and then a resultant image is binarized. Accordingly, accuracy in tone reproduction of an original image can be enhanced.

Effect of Embodiment

This embodiment reduces the number of gray levels by halftoning A and again by a simple process (halftoning B) to match the number of gray levels of an image to that of an output device. Advantages derived from this embodiment are as follows.

The preliminary reduction of the number of gray levels can reduce the image volume and further reduce the load of handling like image transmission. Additionally, the number of output levels can arbitrarily changed depending on output devices. The number can be changed merely by thresholding, which adds no load to the image processing apparatus.

As heretofore illustrated by this embodiment, an efficient system can be accomplished for distribution of an image through a network as well as for display and print of a specific image by many output devices. Advantageous effects in processing speed and resource can thus be obtained.

Second Embodiment

According to a second embodiment, halftoning A is applied to output of a color image. The color image is output by designating colors of respective pixels as output states.

According to the second embodiment, the color state of each pixel in an output image is determined, i.e., which color material is used for expressing a color is determined. For example, four color materials cyan (C), magenta (M), yellow (Y) and black (K) can be used. In actual, eight states of colors are output including cyan, magenta, yellow and black, additionally red (R), green (G) and blue (B) which are each mixture of two of cyan, magenta and yellow, and no-color state (i.e. white (W) which is the color of paper).

An input signal (image to be processed) is a so-called CMYK color image designated by color values of C, M, Y and K. According to the second embodiment, for the purpose of quantitatively analyzing effects of the invention, a color image is used as a sample having a size of 100×100 pixels where colors are uniformly distributed. In other words, the CMYK values are uniform at all pixels of the sample image. Specifically, respective densities are C=15%, M=40%, Y=38% and K=0%.

This input signal is image-processed according to the present invention. For a comparative example, the same input signal is processed through color error diffusion (conventional technique) to produce an output. Respective methods of producing the comparative output and an output by the second embodiment are described in detail below.

Method of Comparative Example

For input signal values of C, M, Y and K as described above, the comparative example performs image processing by error diffusion method specifically in the following way.

An input signal is expressed as input vectors in a four-dimensional space of CMYK. On the other hand, all linear combinations using four unit vectors CMYK in the same space, i.e., 16 (=$2^4$) vectors are set as output vector candidates. For an input vector, the closest one of the 16 output vector candidates is selected as an output vector.

An error vector being a difference between the output vector and the input vector is supplied as feedback to correct an input vector for a pixel which has not been processed (so-called color vector error diffusion). It is noted that the CMYK space is assumed to be linear here and thus there is no interaction between respective dimensions, resulting in the substantially same output as the one implemented by overlapping of colors to which error diffusion is independently applied.

If an output includes black K, an output image is substantially black even if other colors are overlapped.

Therefore, outputs are analyzed in the following discussion by counting such outputs as K. In other words, although there are 16 output vectors, actually 8 output states corresponding to CMYKRGBW are produced.

Method of Second Embodiment

Image processing is performed through the process of halftoning A as described above. First, occurrence probabilities of respective 8 output states are calculated with respect to CMYK color values as input signals. When CMYK values are output at a designated ratio, overlapping of colors occurs probabilistically to generate RGB and K as well as W where no color is exhibited. The ratio is calculated as shown below by means of Neugebauer formula.

$C'=C(1-M)(1-Y)(1-K)$ $M'=(1-C)M(1-Y)(1-K)$ $Y'=(1-C)(1-M)Y(1-K)$ $K'=(1-C)(1-M)(1-Y)K+CMY$ or $CMY(1-K)+K$ $R=(1-C)MY(1-K)$ $G=C(1-M)Y(1-K)$ $B=CM(1-Y)(1-K)$ $W=(1-C)(1-M)(1-Y)(1-K)$

These results are used as occurrence probabilities of respective output states. Using the occurrence probabilities, the multidimensional threshold diffusion method discussed above determines the output state of each pixel. As a parameter used in this process, initial setting threshold is the median (0.5) and constant. Feedback coefficient $\beta$ is also a constant value (0.5).

Output Image Sample and its Analysis

Figure 37:
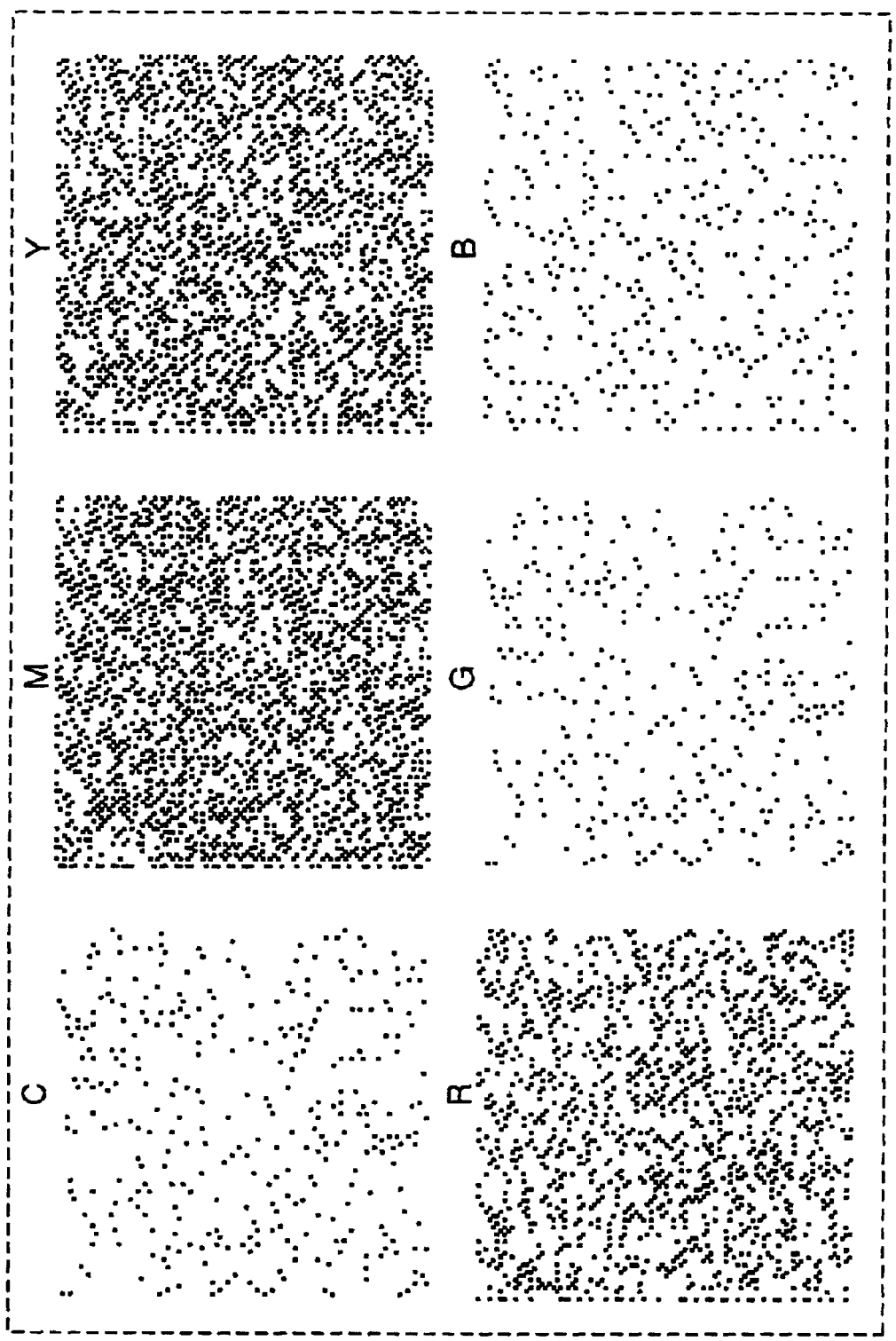
FIG. 37 shows a resultant image in a comparative example.
Figure 38:
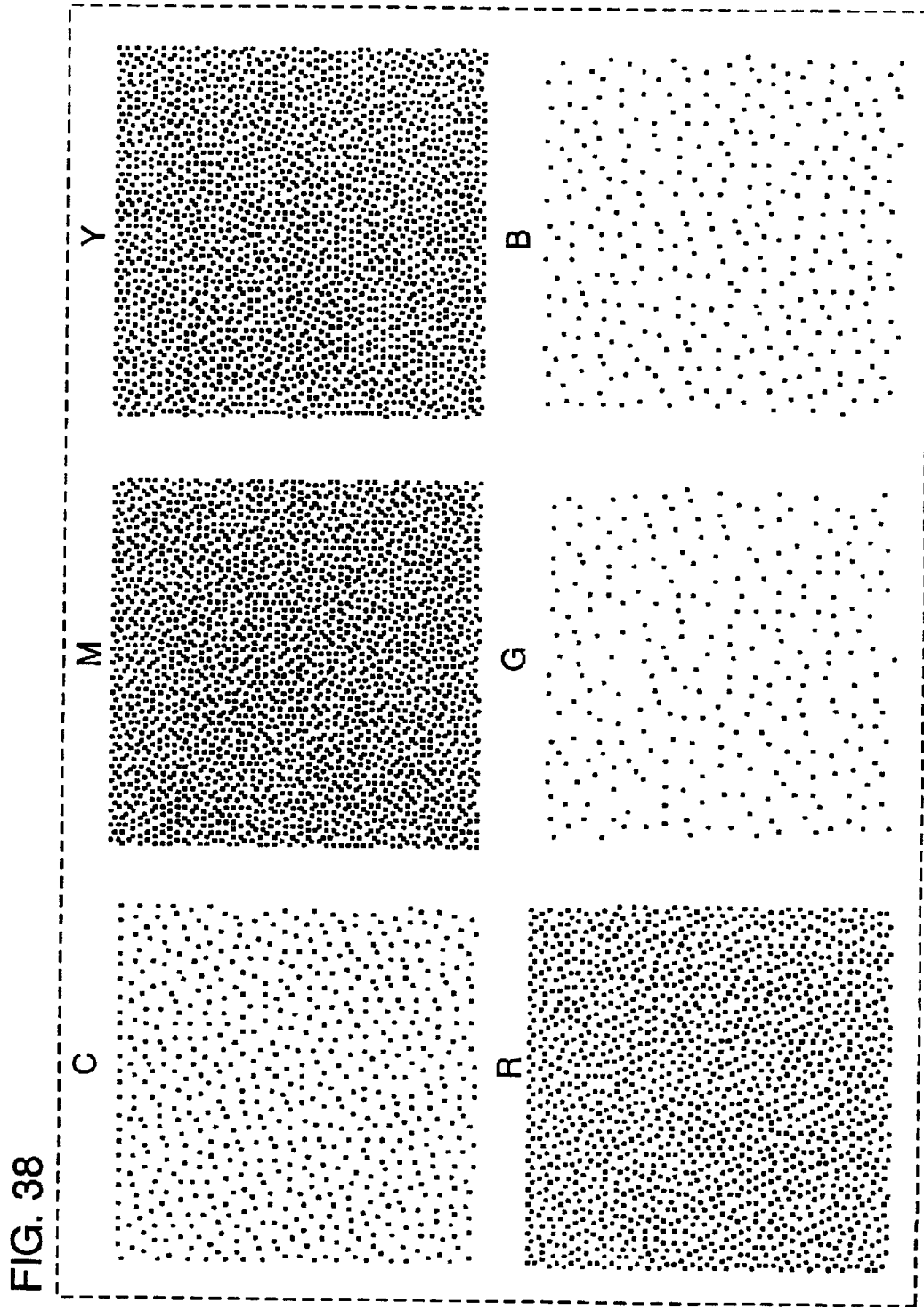
FIG. 38 shows a result provided by an image processing apparatus according to a second embodiment of the present invention.

FIG. 37 shows outputs of C, M, Y, R, G and B in the comparative example while FIG. 38 shows outputs thereof in the second embodiment. Each image is formed of 100× 100 pixels and pixels indicated by black represent pixels where a corresponding color is output.

As seen from outputs shown in FIGS. 37 and 38, the second embodiment (FIG. 38) provides a uniformly distributed dots of each color with respect to a uniform color input. On the other hand, the comparative example (FIG. 37) produces considerably noisy images.

In this way, this embodiment provides an output image having a mixture of at least three output states for a region of the same input state (region having the same color), pixels of each output state being evenly distributed. Namely, with respect to a uniform color input, at least three color states are mixed having pixels of each color state that are evenly distributed.

Figure 39:
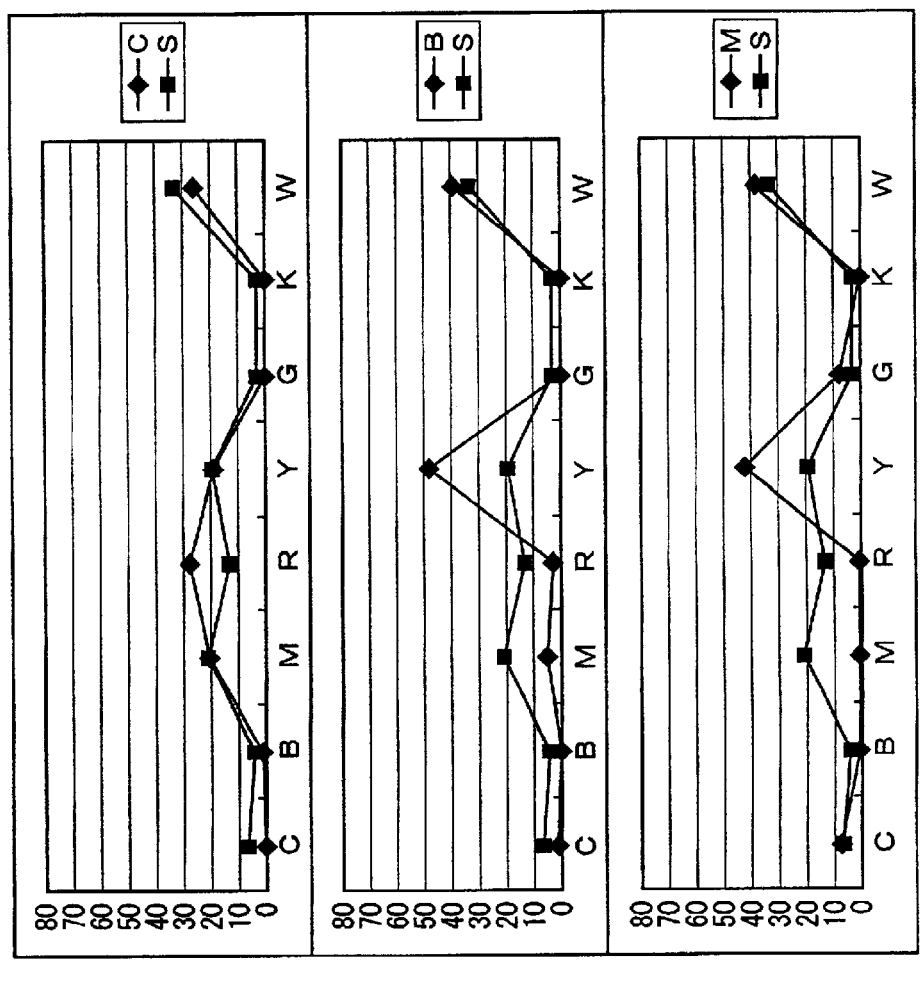
FIGS. 39 and 40 show results of image processing in the comparative example.
Figure 40:
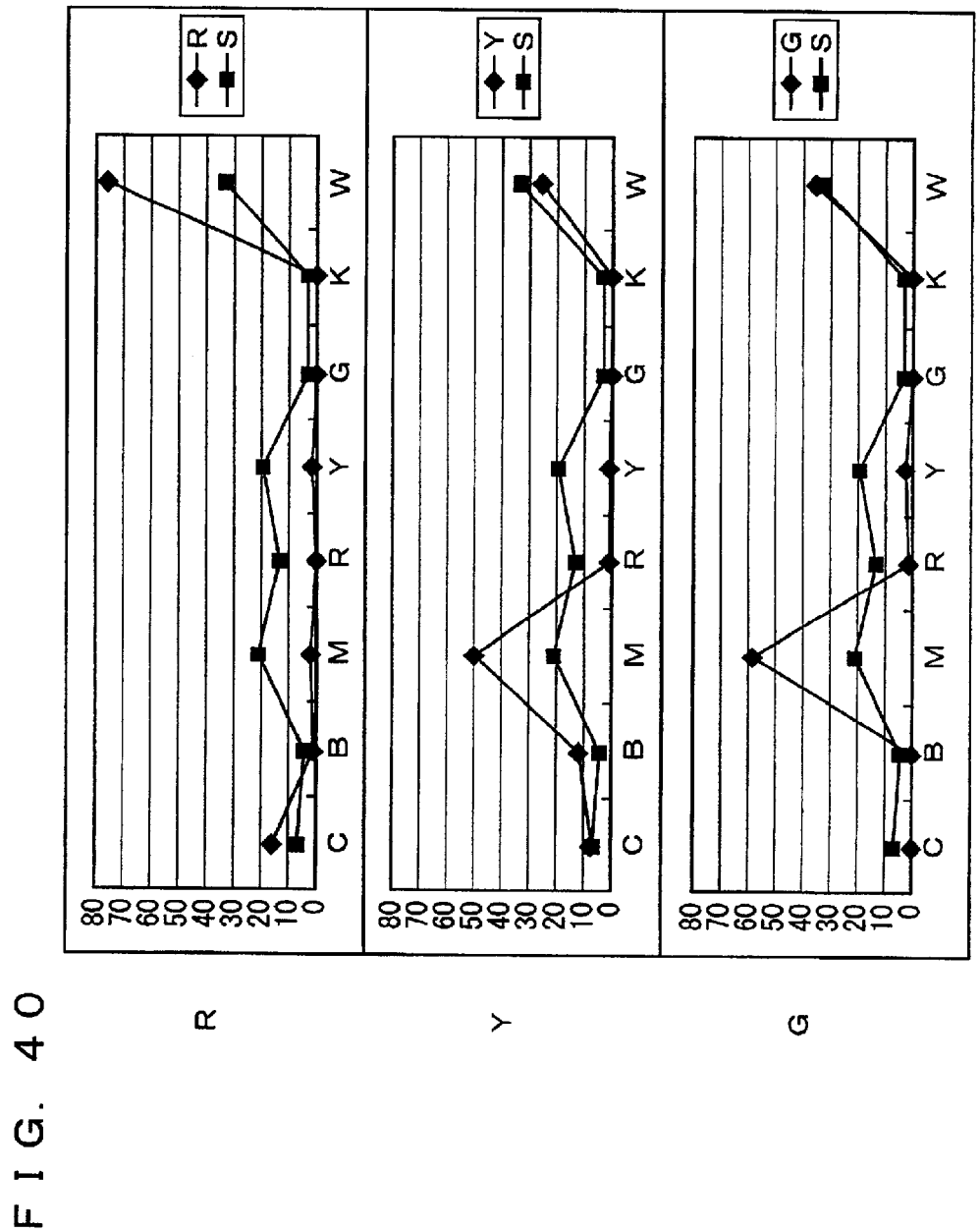
Figure 41:
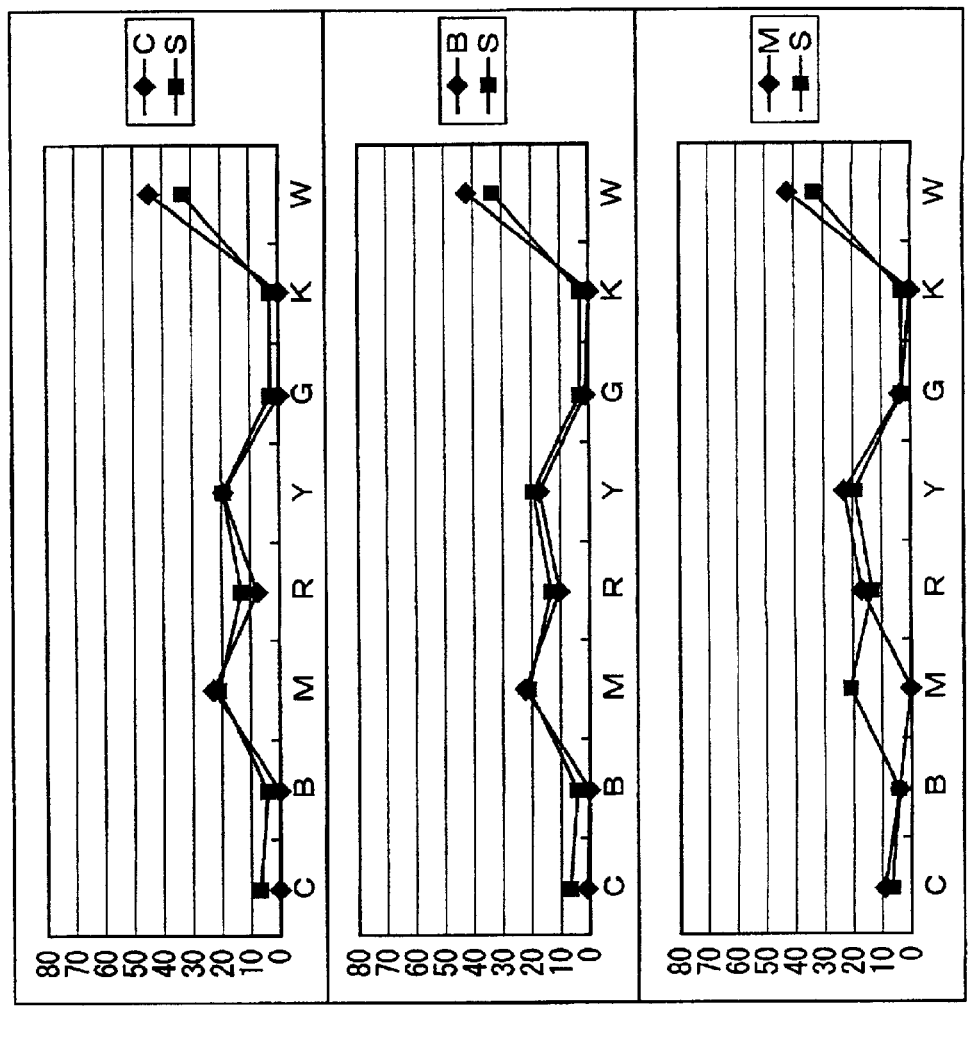
FIGS. 41 and 42 show results of image processing according to the second embodiment.
Figure 42:
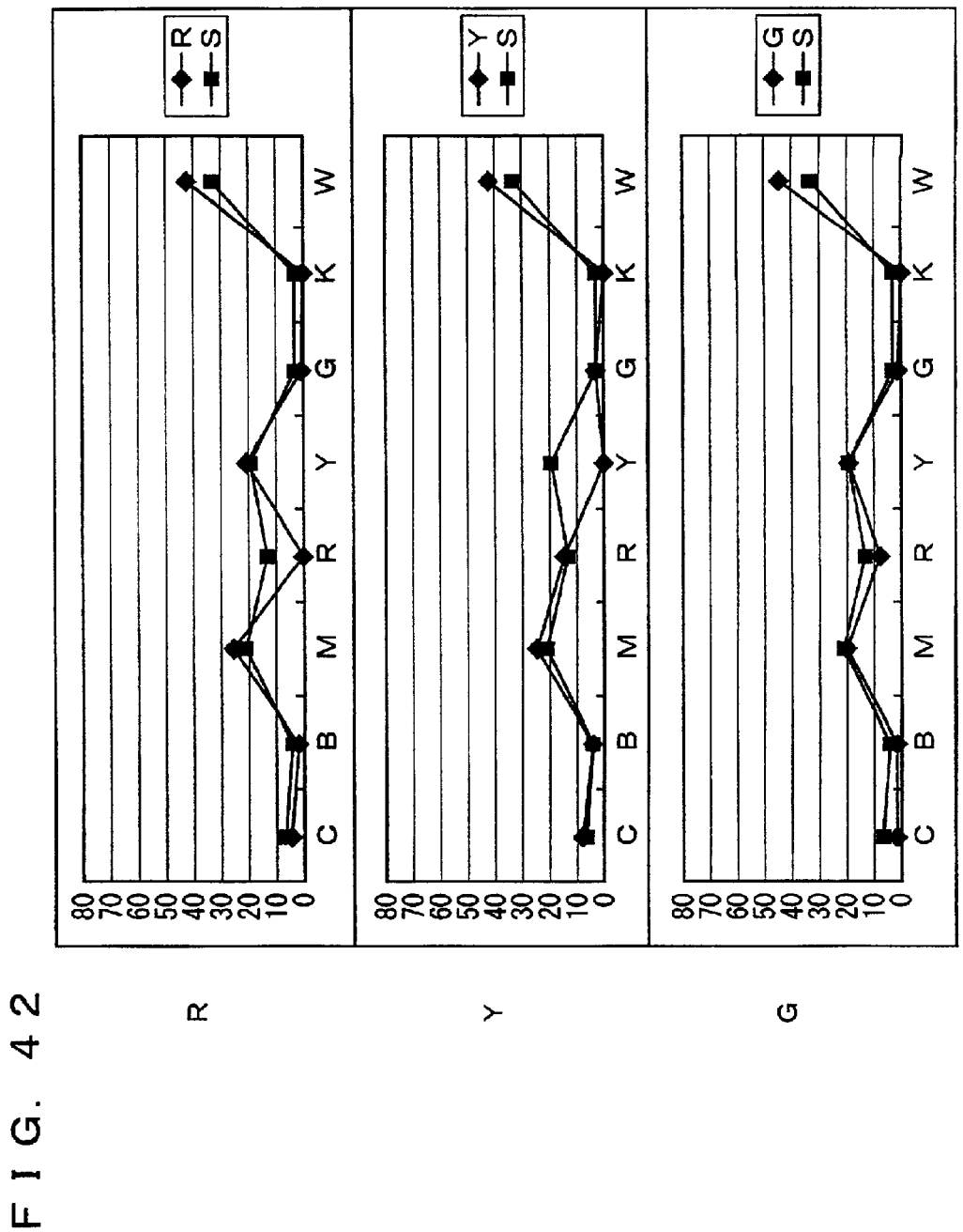
Figure 44:
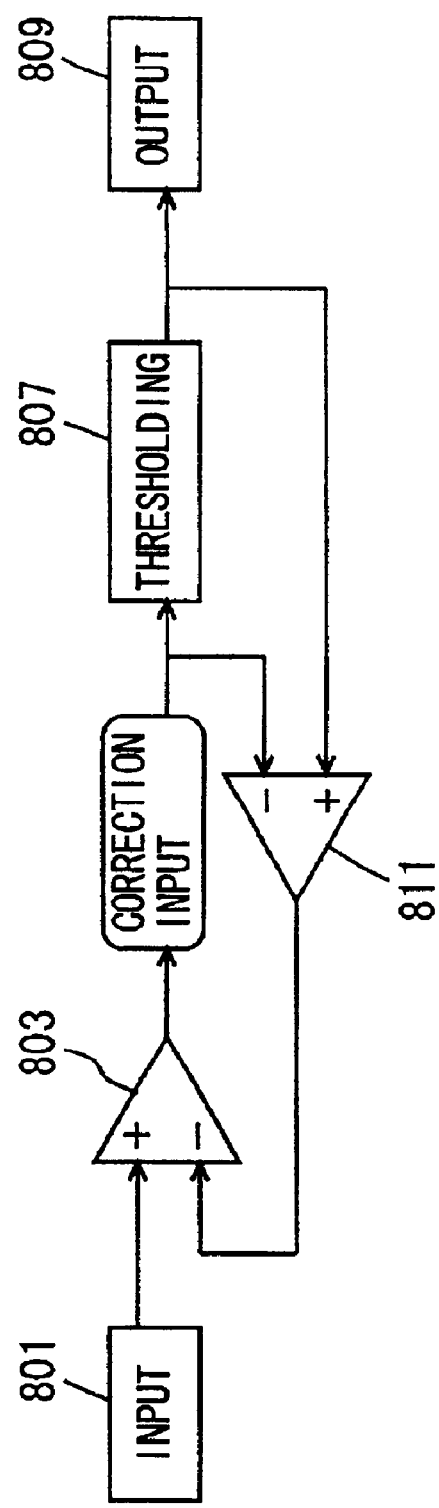
FIG. 44 is a block diagram showing a structure of an image processing apparatus employing error diffusion method.
Figure 45:
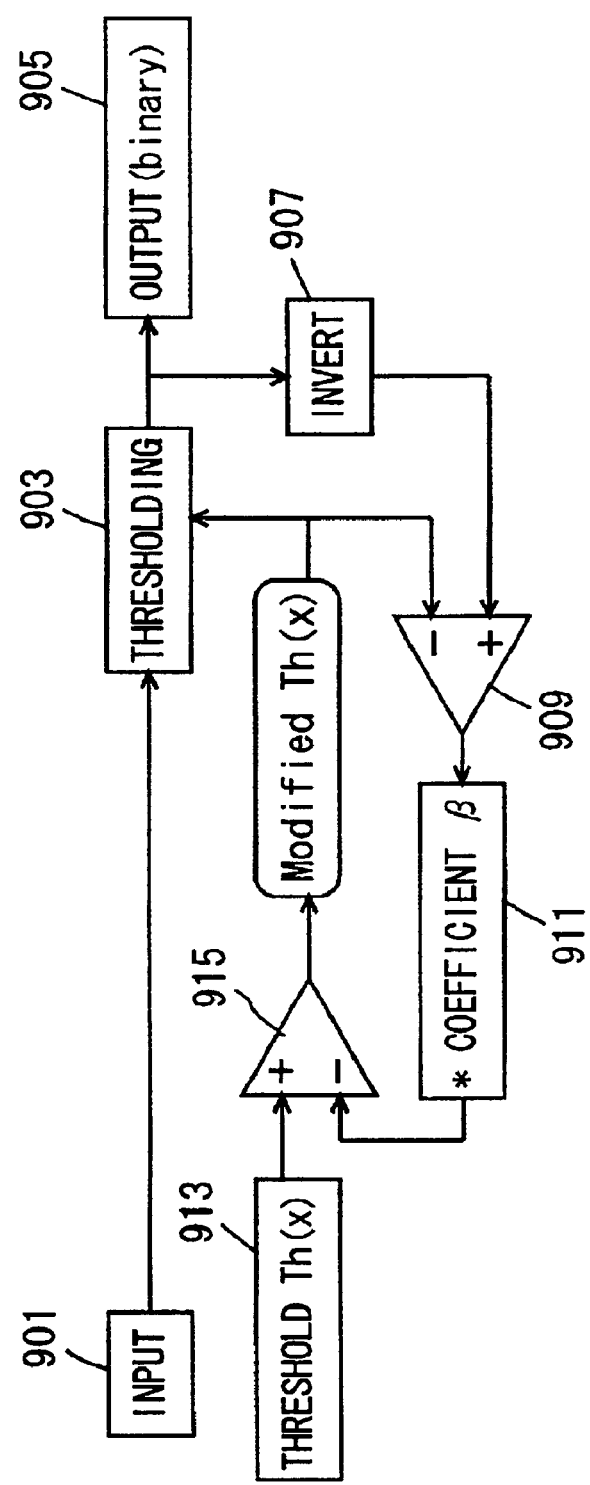
FIG. 45 is a block diagram showing a structure of an image processing apparatus employing threshold diffusion method.
Figure 46:
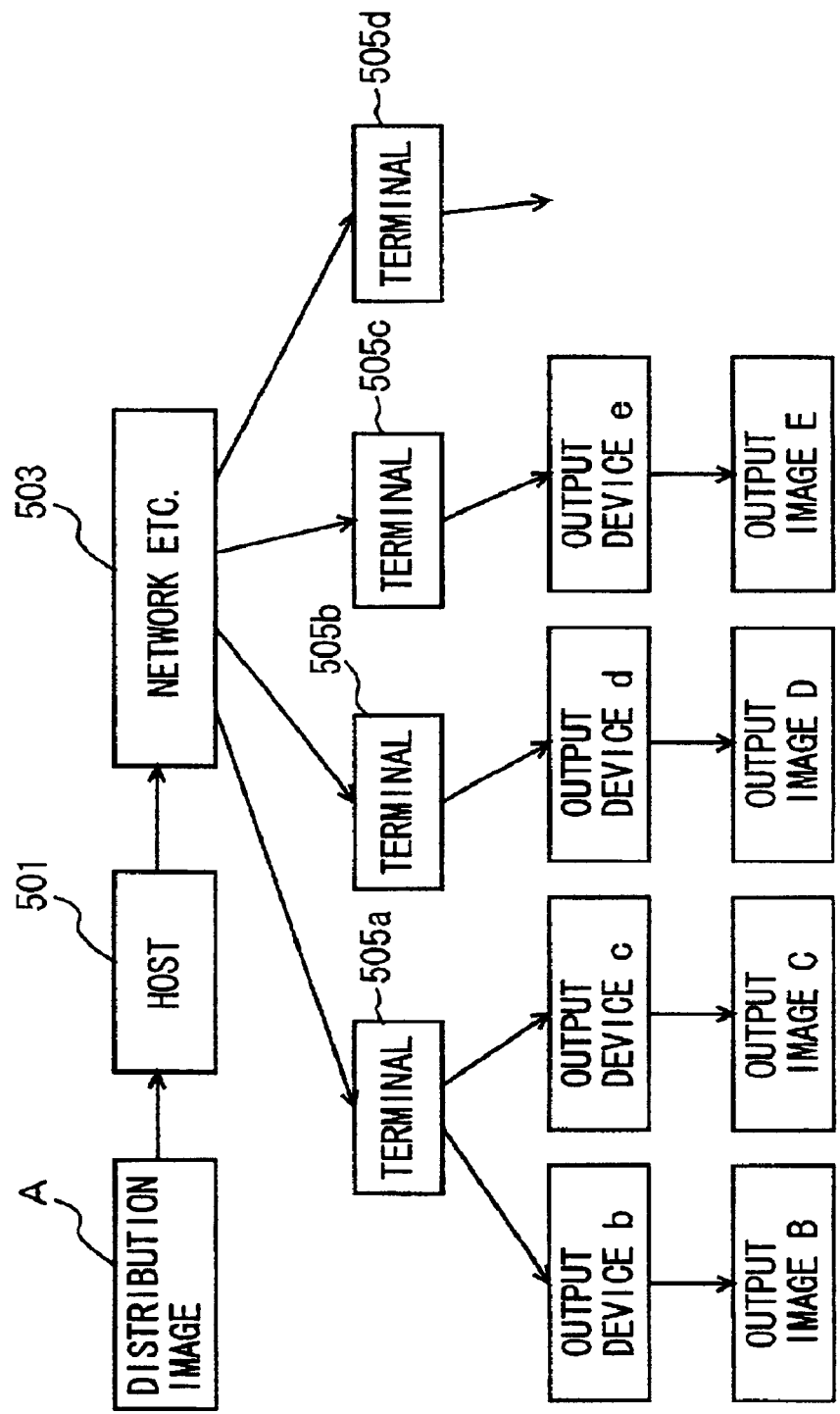
FIG. 46 illustrates a method of distributing an image via a network.
Figure 47:
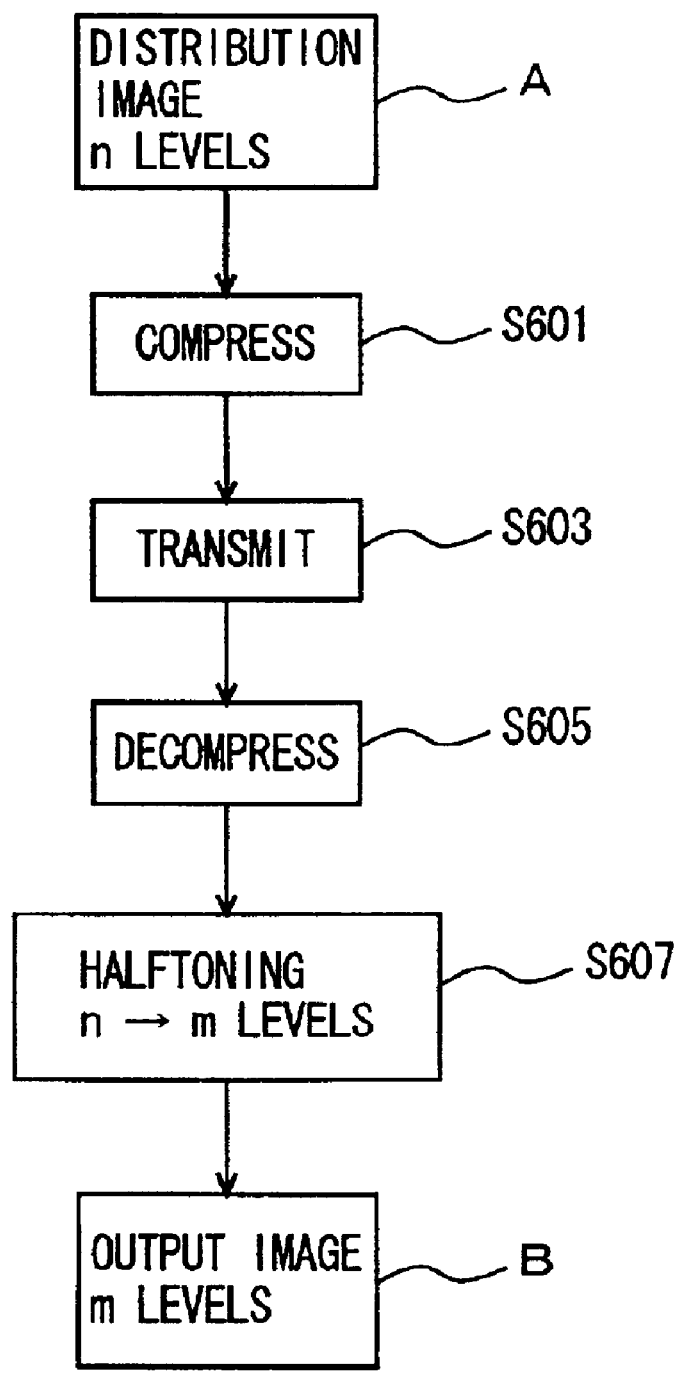
FIGS. 47–50 show first to fourth examples of transmitting an image.
Figure 48:
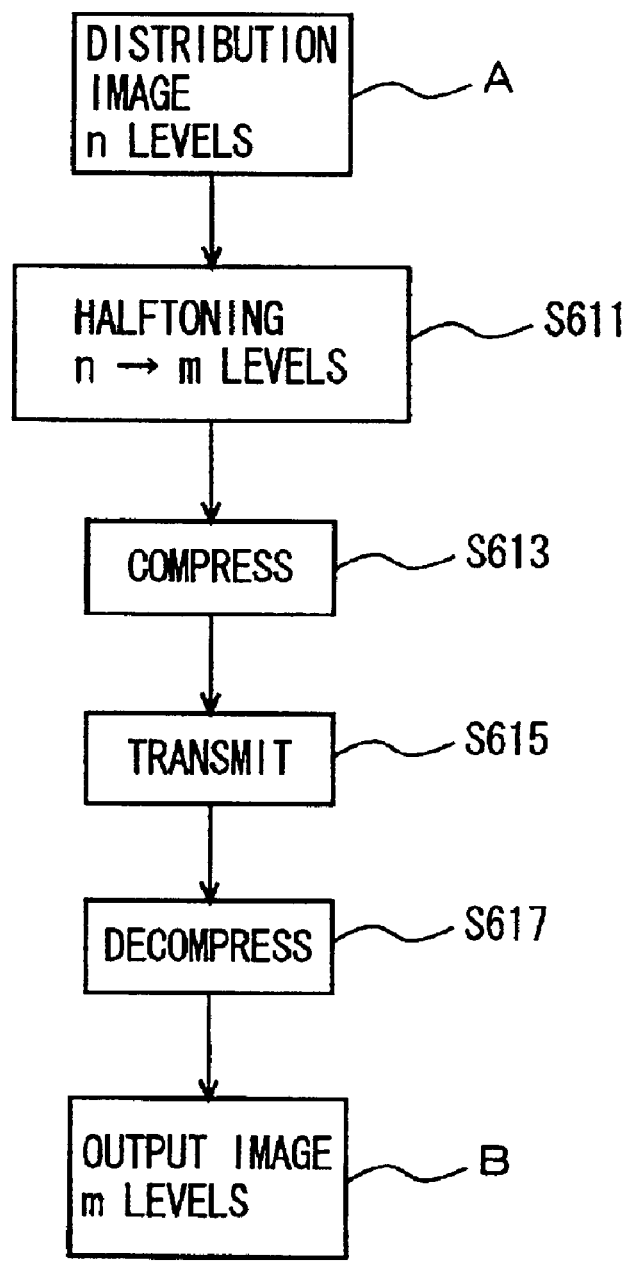
Figure 49:
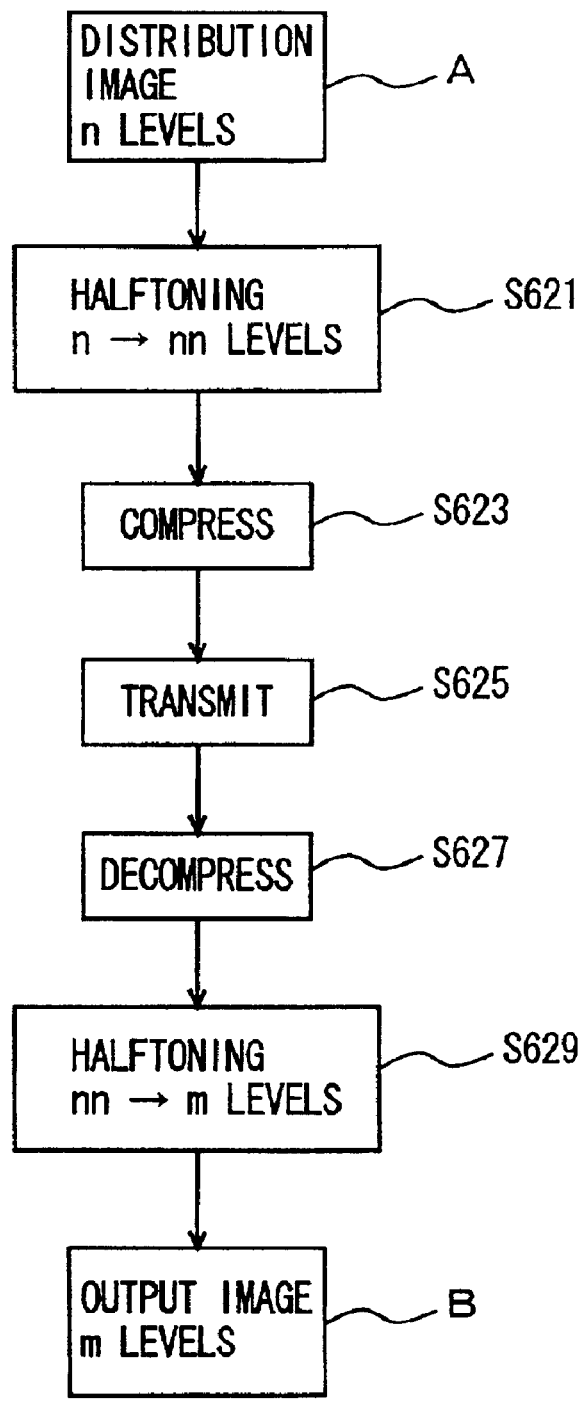
Figure 50:
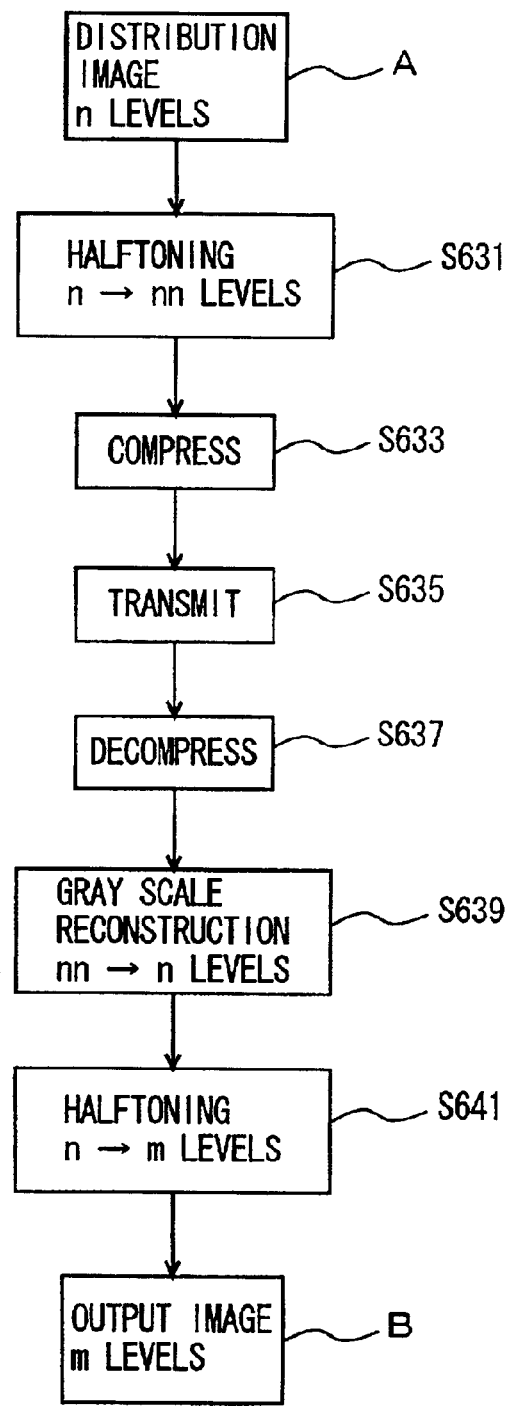

In order to show that colors of pixels adjacent to each other have no strong correlation in the second embodiment, the actual number of adjacent colors is counted. Results are shown in FIGS. 39–42. In these drawings, FIGS. 39 and 40 show which colors are adjacent to CMYKRGB pixels each in the comparative example and FIGS. 41 and 42 show results of measurement conducted in a similar manner to that applied to the comparative example.

Specifically, the number of all pixel colors adjacent to a specific color is counted to show by ratio which color frequently occurs in each graph. The lateral axis of the graph indicates colors of adjacent pixels and the longitudinal axis indicates the relative occurrence ratio of the colors.

The line denoted by S is a reference line common to all graphs, representing probabilistic occurrence ratio with respect to an input value calculated by means of Neugebauer formula.

Further, FIG. 43 shows relations between colors in terms of approximation and complementary.

Regarding the comparative example (FIGS. 39 and 40), all lines of six colors in respective graphs are different from each other and not similar to reference line S. A feature observed here is that, for a subject color taken as an example, a color close to the subject color is unlikely to occur while the complementary color thereof is likely to occur. For example, when the subject color is C, GCB colors are unlikely to occur while MRY colors are likely to occur. Namely, the color of one pixel is strongly influenced by colors of adjacent pixels.

On the other hand, regarding the second embodiment (FIGS. 41 and 42), lines of respective six graphs are similar to each other and also to reference line S. The only difference relative to reference line S is that adjacent pixels to the pixel of a subject color are unlikely to exhibit the same color as the subject color. In other words, the color of a certain pixel is unlikely to be influenced by adjacent pixel colors and colors occur substantially as per occurrence probabilities except that the same colors are unlikely to be located next to next.

According to the second embodiment, colors can arbitrarily combined to be arranged through arbitrary setting. Further, the colors can uniformly be arranged without concentration of any color. Then, the quality of a color image which is produced with a limited number of colors can be enhanced and thus a visually superior color image can be achieved.

Other Output Examples

Outputs listed below are possible corresponding to a plurality of occurrence states of halftoning A.

1. Whether a dot is marked or not is determined (N=2 and binary output is provided).

2. The size of a dot is determined (large/middle/small).

3. The position of a dot, nozzle to be used in an inkjet printer, the shape of a dot and the like are determined.

4. Whether any additive is used for colors, the amount of the additive and the like are determined.

5. A combination of items 1 to 4 above is determined.

6. Other desired elements to be controlled per pixel are determined.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus converting first image data having a predetermined number of gray levels into second image data having a smaller number of gray levels than said predetermined number comprising:

an input unit successively inputting a signal of each pixel in the first image data;

an occurrence probability setting unit setting per pixel an occurrence probability of each gray level of the second image data according to said input signal;

a threshold setting unit setting per pixel a threshold used for converting the input signal of each pixel of the first image data into a signal of each pixel of the second image data;

a converting unit according to said set occurrence probability and said set threshold to convert said input signal of each pixel of the first image data into the signal of each pixel of the second image data;

a calculating unit according to a gray level of said signal of each pixel of the second image data generated by the conversion and to said set occurrence probability or said set threshold to calculate a feedback value for an adjacent unprocessed pixel; and a correcting unit according to said calculated feedback value to correct the occurrence probability or threshold used for converting the unprocessed pixel.

2. The image processing apparatus according to claim 1, wherein said calculating unit calculates the feedback value per gray level of said second image data, and said correcting unit corrects said occurrence probability or threshold per gray level of said second image data.

3. The image processing apparatus according to claim 1, wherein the sum of values each determined by multiplying the occurrence probability of each gray level of the second image data corresponding to an input value by a corresponding value of each gray level of the second image data is equal to the input value, and the sum of occurrence probabilities set for respective gray levels of the second image data corresponding to the input value is equal to 1.

4. The image processing apparatus according to claim 3, wherein said occurrence probability is a function having the pixel signal of said first image data as a variable, the function depending on each gray level of the second image data.

5. The image processing apparatus according to claim 1, wherein said threshold setting unit sets the threshold per gray level of the second image data, said occurrence probability setting unit sets the occurrence probability per gray level of the second image data, and said converting unit subtracts, from said occurrence probability set per gray level, corresponding said threshold set per gray level, to decide which is maximum one of values determined by said subtraction for respective gray levels and select gray level corresponding to the maximum value.

6. The image processing apparatus according to claim 1, wherein said calculating unit calculates the feedback value by deciding, according to said gray level of said signal of each pixel of the second image data generated by conversion, whether said threshold is inverted or not and determining sign of the threshold, and said correcting unit corresponds said threshold according to said calculated feedback value.

7. The image processing apparatus according to claim 1, wherein said calculating unit calculates the feedback value by deciding, according to said gray level of said signal of each pixel of the second image data generated by conversion, whether said threshold is inverted or not and determining sign of the threshold, and said correcting unit corrects said occurrence probability according to said calculated feedback value.

8. The image processing apparatus according to claim 1, wherein said calculating unit calculates the feedback value by deciding, according to said gray level of said signal of each pixel of the second image data generated by conversion, whether said occurrence probability is inverted or not and determining sign of the occurrence probability, and said correcting unit corrects said occurrence probability according to said calculated feedback value.

9. The image processing apparatus according to claim 1, wherein said calculating unit calculates the feedback value by deciding, according to said gray level of said signal of each pixel of the second image data generated by conversion, whether said occurrence probability is inverted or not and determining sign of the occurrence probability, and said correcting unit corrects said threshold according to said calculated feedback value.

10. The image processing method according to new claim 1, wherein said states are levels of gray and said number of states is the number of gray levels.

11. The image processing method according to new claim 1, wherein said states are colors and said number of states is the number of colors.

12. An image processing method for converting first image data having a predetermined number of gray levels into second image data having a smaller number of gray levels than said predetermined number comprising the steps of:

successively inputting a signal of each pixel in the first image data;

setting per pixel an occurrence probability of each gray level of the second image data according to said input signal;

setting per pixel a threshold used for converting the input signal of each pixel of the first image data into a signal of each pixel of the second image data;

converting, according to said set occurrence probability and said set threshold, said input signal of each pixel of the first image data into the signal of each pixel of the second image data;

calculating, according to a gray level of said signal of each pixel of the second image data generated by the conversion and to said set occurrence probability or said set threshold, a feedback value for an adjacent unprocessed pixel; and correcting, according to said calculated feedback value, the occurrence probability or threshold used for converting the unprocessed pixel.

13. The image processing method according to claim 12, wherein said calculating step calculates the feedback value per gray level of said second image data, and said correcting step corrects said occurrence probability or threshold per gray level of said second image data.

14. The image processing method according to claim 12, wherein the sum of values each determined by multiplying the occurrence probability of each gray level of the second image data corresponding to an input value by a corresponding value of each gray level of the second image data is equal to the input value, and the sum of occurrence probabilities set for respective gray levels of the second image data corresponding to the input value is equal to 1.

15. The image processing method according to claim 12, wherein said threshold setting step sets the threshold per gray level of the second image data, said occurrence probability setting step sets the occurrence probability per gray level of the second image data, and said converting step subtracts, from said occurrence probability set per gray level, corresponding said threshold set per gray level, to decide which is maximum one of values determined by said subtraction for respective gray levels and select a gray level corresponding to the maximum value.

16. An image processing method for converting first image data having a predetermined number of gray levels into image data having a smaller number of gray levels than said predetermined number comprising:

a first step of converting said first image data into a first halftone image exhibiting a mixture of at least three levels with respect to a region of the same input state; and a second step of thresholding the first halftone image generated by said first step to generate a second halftone image having the smaller number of grey levels than said predetermined number, wherein said first step includes the steps of:

successively inputting a signal of each pixel in the first image data;

setting per pixel an occurrence probability of each gray level of the first halftone image according to said input signal;

setting per pixel a threshold used for converting the input signal of each pixel of the first image data into a signal of each pixel of the first halftone image;

converting, according to said set occurrence probability and said set threshold, said input signal of each pixel of the first image data into the signal of each pixel of the first halftone image;

calculating, according to a gray level of said signal of each pixel of the first halftone image generated by the conversion and to said set occurrence probability or said set threshold, a feedback value for an adjacent unprocessed pixel; and correcting, according to said calculated feedback value, the occurrence probability or threshold used for convening the unprocessed pixel.

17. An image processing method for converting an image represented by a group of pixels having a first large number of states into an image represented by a group of pixels having a second number of states smaller than said first number of states arid thereby reducing the number of states, wherein when a region of said image before converted is represented by pixels of the same states, said region is converted into a region represented by pixels of at least three states so that pixels of each state are evenly distributed throughout said region while the number of states of the image as a whole after converted is smaller than the number of states image before converted.

18. An image processing method for converting first image data having a first number of gray levels into image data having a third number of gray levels smaller than said first number of gray levels comprising:

a first step of converting said first image data into second image data having a second number of gray levels smaller than said first number f gray levels by image processing said first image data to convert a region represented by pixels of the same gray levels of said first image data into a region represented by pixels of at least three gray levels so that pixels of each gray level are evenly distributed throughout said region after converted while the number of gray levels of an image as a whole after converted is smaller than the number of gray levels of the image before converted; and a second step of thresholding said second image data generated by said first step to generate an image having said third number of gray levels smaller than said second number of gray levels.

19. An image forming method for outputting first image data having a first number of gray levels as image data having a third number of gray levels smaller than said first number of gray levels comprising:

a first step of converting said first image data into second image data having a second number of gray levels smaller than said first number of gray levels by image processing said first image data to convert a region represented by pixels of the same gray level of said first image data into a region represented by pixels of at least three gray levels so that pixels of each gray level are evenly distributed throughout said region after converted while the number of gray levels of an image as a whole after converted is smaller than the number of gray levels of the image before converted; and a second step of receiving, by a plurality of terminals, said second image data generated by said first step of outputting, by said plurality of terminals, said second image data as said image data having said third number of gray levels smaller than said second number of gray levels.

20. A method of distributing first image data having a first number of gray levels as second image data having a second number of gray levels smaller than said first number of gray levels comprising:

a first step of converting said first image data into said second image data having said second number of gray levels smaller than said first number of gray levels by image processing said first image data to convert a region represented by pixels of the same gray level of said first image data into a region represented by pixels of at lease three gray levels so that pixels of each gray level are evenly distributed throughout said region after converted while the number of gray levels of an image as a whole after converted is smaller than the number of gray levels of the image before converted; and a second step of holding said second image data generated by said first step on a network for distribution.

21. An image forming method for converting first image data having a predetermined number of gray levels into image data having a smaller number of gray levels than said predetermined number of gray levels and outputting the converted image data comprising the steps of:

receiving said first image data having undergone image-processing by converting an input region represented by pixels of the same grey level of said first image data into a region represented by pixels of at least three gray levels so that pixels of each gray levels are evenly distributed throughout said region after converted while the number of gray levels of an image as a while after converted is smaller than the number of gray levels of the image before converted; and thresholding said received first image data to convert said first image data into image data having at most the number of gray levels of said first image data and output the converted image data.

* * * * *